United States Patent
Farid et al.

(10) Patent No.: US 10,154,762 B2
(45) Date of Patent: Dec. 18, 2018

(54) AUTOMATED MEAL PRODUCTION SYSTEM AND APPARATUS

(71) Applicant: Spyce, Inc., Somerville, MA (US)

(72) Inventors: Michael S. Farid, Boston, MA (US); Braden E. Knight, Boston, MA (US); Luke S. Schlueter, Cambridge, MA (US); Kale T. Rogers, Boston, MA (US); Wyatt L. Ubellacker, Cambridge, MA (US); Sophia N. Seidell, New York, NY (US)

(73) Assignee: SPYCE FOOD CO., Somerville, MA (US)

(*) Notice: Subject to any disclaimer, the term of this patent is extended or adjusted under 35 U.S.C. 154(b) by 237 days.

(21) Appl. No.: 15/137,968

(22) Filed: Apr. 25, 2016

(65) Prior Publication Data
US 2017/0172350 A1    Jun. 22, 2017

Related U.S. Application Data

(60) Provisional application No. 62/157,961, filed on May 7, 2015, provisional application No. 62/217,644, filed on Sep. 11, 2015.

(51) Int. Cl.
*A47J 44/00* (2006.01)
*A47F 10/06* (2006.01)

(52) U.S. Cl.
CPC ............ *A47J 44/00* (2013.01); *A47F 10/06* (2013.01)

(58) Field of Classification Search
CPC .................................. A47F 10/06; A47J 44/00
USPC .......... 99/325, 357, 348, 407, 448, 451, 484
See application file for complete search history.

(56) References Cited

U.S. PATENT DOCUMENTS

| | | | |
|---|---|---|---|
| 4,173,925 A | 11/1979 | Leon | |
| 4,919,950 A | 4/1990 | Mak | |
| 5,228,382 A | 7/1993 | Hayashi et al. | |
| 5,386,102 A * | 1/1995 | Takikawa | H05B 6/062 |
| | | | 219/620 |
| 6,112,645 A | 9/2000 | Chang | |
| 6,843,166 B1 | 1/2005 | Li | |
| 7,001,626 B2 | 2/2006 | Sands et al. | |
| 7,174,830 B1 | 2/2007 | Dong | |

(Continued)

FOREIGN PATENT DOCUMENTS

| | | |
|---|---|---|
| GB | 2521999 | 7/2015 |
| WO | 2013106954 A1 | 7/2013 |

OTHER PUBLICATIONS

PCT/US2017024821; International Search Report and Written Opinion; dated Jun. 6, 2017; US.

*Primary Examiner* — Dana Ross
*Assistant Examiner* — Joe E Mills, Jr.
(74) *Attorney, Agent, or Firm* — Dennis D. Brown; Brown Patent Law, P.L.L.C.

(57) ABSTRACT

An automated kitchen system having multiple cooking and/or mixing pots and having containers and dispensers for multiple ingredients. A customer or other person or system selects or creates a meal or other food product and the ingredients for the meal or other product are transferred from dispensers to the cooking and/or mixing pots which simultaneously cook and/or mix the ingredients. After cooking, the meal or other product is served and the cooking pot is cleaned and sanitized and oriented to receive the ingredients for the next meal or other product.

16 Claims, 21 Drawing Sheets

(56) References Cited

U.S. PATENT DOCUMENTS

| | | |
|---|---|---|
| 8,276,505 B2 | 10/2012 | Buehler |
| 8,820,219 B2 | 9/2014 | Buehler |
| 9,131,807 B2 | 9/2015 | Roy et al. |
| 2002/0015355 A1 | 2/2002 | Sanpei et al. |
| 2003/0159593 A1 | 8/2003 | Leutwyler |
| 2004/0149776 A1 | 8/2004 | Fegin et al. |
| 2004/0173103 A1 | 9/2004 | Won |
| 2010/0303972 A1 | 12/2010 | Srivastava |
| 2014/0230660 A1 | 8/2014 | He |
| 2015/0019354 A1 | 1/2015 | Chan et al. |
| 2015/0122133 A1 | 5/2015 | Zhang |
| 2016/0235239 A1* | 8/2016 | Patadia .................. A47J 44/00 |

* cited by examiner

AUTOMATED MEAL PRODUCTION SYSTEM AND APPARATUS

RELATED CASES

This application claims the benefit of U.S. Provisional Patent Application Ser. No. 62/157,961 filed on May 7, 2015 and U.S. Provisional Patent Application No. 62/217,644 filed Sep. 11, 2015 and incorporates said provisional applications by reference into this document as if fully set out at this point.

FIELD OF THE INVENTION

The present invention relates to automated kiosks and other automated kitchen apparatuses and systems for preparing meals, entrees, and other food products.

BACKGROUND OF THE INVENTION

On any given day, about one quarter of the US population eats some form of take out or fast food. While this may be a convenient and cost effective alternative to making home cooked meals, fast food and take-out meals are often unhealthy and consist of lower quality ingredients. Fast food restaurants spend significantly more on employee costs and rent than they do on food and beverage costs. These operating costs prevent restaurants from being able to sell high-quality meals at affordable prices.

Fast food and take out restaurants compromise on food quality in order to offer competitive prices. On average, low cost, limited service restaurants spend just 28% of total income on food and beverage costs, compared to 27% on labor and 10% on rent. At many fast food restaurants, the face value of most meals far exceeds the ingredient costs required to produce the meals. In an industry that is so competitive on price, restaurants are forced to use cheaper processed ingredients and cannot dedicate resources towards food and meal development. Poor quality fast food has been shown to be a major contributor to obesity in the U.S.

Consequently, a need exists for an alternative to fast food restaurants which provides healthier meals at competitive prices

SUMMARY OF THE INVENTION

The present invention provides a meal preparation system and apparatus which satisfy the needs and alleviate the problems discussed above. The invention provides a fast food restaurant/kitchen concept or kiosk with drastically reduced overhead costs. This is possible by automating the entire meal production system, therefore eliminating the need for onsite employees and reducing the space required for the restaurant. The inventive apparatus is loaded with high quality raw ingredients, such as meats, vegetables and sauces, and will process, mix, cook and dispense made-to-order gourmet quality meals upon request.

The inventive apparatus can be configured to autonomously cook and serve up to 300 meals or more per day with no human involvement. The automated restaurant will preferably be restocked and serviced by employees once every 24 hours. By way of example, the inventive apparatus and system are well suited for preparing meals such as stir fry, pasta dishes and rice dishes that consist of small-part ingredients that need to be simultaneously mixed and heated.

The inventive apparatus is preferably open-facing so that customers can see their meals being cooked from fresh ingredients and served. Customers can customize their meals with different sauces or ingredients. The menu system will preferably allow customers to select proteins, vegetables and starches to create their own meals. Customers have the option of ordering their meals via a mobile app, or by using a touchscreen or other user interface on the kitchen apparatus itself. Payment can be made via credit card or debit card.

Alternatively, the inventive apparatus and system can be used in industrial applications for the automated production of ready-to-eat food products or entrees in bulk.

In one aspect, there is provided an automated system for preparing meals preferably comprising: (a) a plurality of ingredient holding and dispensing assemblies, each of the ingredient holding and dispensing assemblies comprising a container for holding a supply of a different ingredient and a corresponding dispenser beneath the container for dispensing a predetermined amount of the ingredient from a discharge of the ingredient holding and dispensing assembly and (b) a plurality of preparation assemblies. Each of the preparation assemblies preferably comprises a preparation pot which is mounted for rotating the pot about a rotational axis, the preparation pot also being mounted for pivoting the pot about a secondary axis between a receiving orientation of the pot for receiving the ingredients dispensed by a plurality of the ingredient holding and dispensing assemblies, a preparation orientation for mixing or both cooking and mixing the ingredients while the pot is rotated about the rotational axis, and a dispensing orientation for dispensing the ingredients from the pot.

In another aspect, the preparation pots are preferably cooking pots wherein each of the preparation assemblies further comprises a heating element positioned adjacent to the cooking pot when the cooking pot is in the preparation orientation, for heating the cooking pot. The heating element is preferably positioned beneath the cooking pot when the cooking pot is in the preparation orientation.

In another aspect, the ingredient holding and dispensing assemblies of the automated system can be movable with respect to the preparation assemblies so that the discharge of each of the ingredient holding and dispensing assemblies can be positioned above the preparation pot of each of the preparation assemblies for directly dispensing the ingredient held by the ingredient holding and dispensing assembly into the preparation pot in said predetermined amount.

In another aspect, the preparation assemblies can be movable with respect to the ingredient holding and dispensing assemblies so that the preparation pot of each of the preparation assemblies can be positioned beneath the discharge of each of the ingredient holding and dispensing assemblies for dispensing the ingredient held by the ingredient holding and dispensing assembly directly into the preparation pot in said predetermined amount.

In another aspect, the preparation assemblies and the ingredient holding and dispensing assemblies can be installed at fixed locations and the automated system can comprise a transfer assembly comprising one or more transfer containers mounted for automated movement from any of the ingredient holding and dispensing assemblies to any of the preparation assemblies and for automated movement from any of the preparation assemblies to any of the ingredient holding and dispensing assemblies. Each of the transfer containers can also be movable between a receiving position for receiving the ingredients from the holding and dispensing assemblies and a delivery position for delivering the ingredients into the preparation pots of the preparation assemblies.

In another aspect, when a transfer assembly is used as just described, the transfer assembly can further comprise: (a) a slide rail mounted in a housing of the automated system and (b) a carrier for the one or more transfer containers, the carrier being slideably mounted on the slide rail. The one or more transfer containers will preferably be pivotably retained by the carrier for pivoting movement between the receiving position for receiving the ingredients from the holding and dispensing assemblies and the delivery position for delivering the ingredients into the preparation pots of the preparation assemblies.

In another aspect, the preparation pot of each of the preparation assemblies can include a mixing fin in an interior cavity of the pot, the mixing fin extending longitudinally along an interior side wall of the interior cavity. The interior mixing fin will preferably project inwardly from the interior side wall into the cavity a distance in the range of from 1 to 6 cm. It is also preferred that the leading contacting surface of the mixing fin be angled away from the direction of rotation of the preparation pot. The leading contacting surface of the mixing fin can be curved, straight, or any other desired shape.

In another aspect, the dispenser for at least one of the ingredient holding and dispensing assemblies can comprise: (a) a reciprocatable tray for dispensing the ingredient held by the ingredient holding and dispensing assembly, the reciprocatable tray having an upper opening for receiving the ingredient and (b) a trimming blade which cuts away any excess amount of the ingredient which projects from the upper opening of the reciprocatable tray.

In another aspect, the automated system can further comprise a program code which is embodied on a computer readable storage component and is readable by a processing unit of the automated system to operate the automated system according to a programmed procedure to prepare a meal, an entrée, or other food product in response to an order received by the processing unit from a customer, from an operator of a food production facility, or from a central operation control system or computer in a food production facility. In another aspect, the order can be received by the processing unit from a customer via a mobile app.

In another aspect, the inventive apparatus and system can prepare meals, entrees, or other food products in accordance with a process wherein: raw ingredients move along a circular, semi-circular or linear path for delivering various portions of the ingredients to different preparation assemblies; the preparation assemblies mix or both mix and cook the meals, entrees, or other food products; the meals, entrees, or other food products are dispensed; after dispensing each meal, entrée or other food product, the preparation pot of the preparation assembly is cleaned and sanitized (preferably using high-pressure water and a cleaning agent); and the preparation assembly is then ready to receive ingredients for the next meal, entree, or other food product. The apparatus is preferably equipped with a variety of sensors, such as temperature and weight sensors for cooking in order to use feedback control to ensure that meals, entrees and other food products are cooked safely and consistently. Manual cleaning, maintenance, and refilling of the apparatus is only required once per day.

In another aspect, the inventive apparatus and system can alternatively operate in accordance with the inventive process such that the ingredient holding and dispensing assemblies remain in fixed position and the preparation assemblies are moved along a circular, semi-circular or linear path for receiving the ingredients from the dispensers.

In another aspect, the inventive apparatus and system can alternatively operate in accordance with the inventive process such that (a) the preparation assemblies remain in fixed position, (b) the ingredient holding and dispensing assemblies also remain in fixed position, and (c) the ingredients are transferred from the holding and dispensing assemblies to the preparation pots of the preparation assemblies using a moveable transfer assembly.

Further aspects, features, and advantages of the present invention will be apparent to those of ordinary skill in the art upon examining the accompanying drawings and upon reading the following detailed description of the preferred embodiments.

DETAILED DESCRIPTION OF THE PREFERRED EMBODIMENTS

Figure 1:
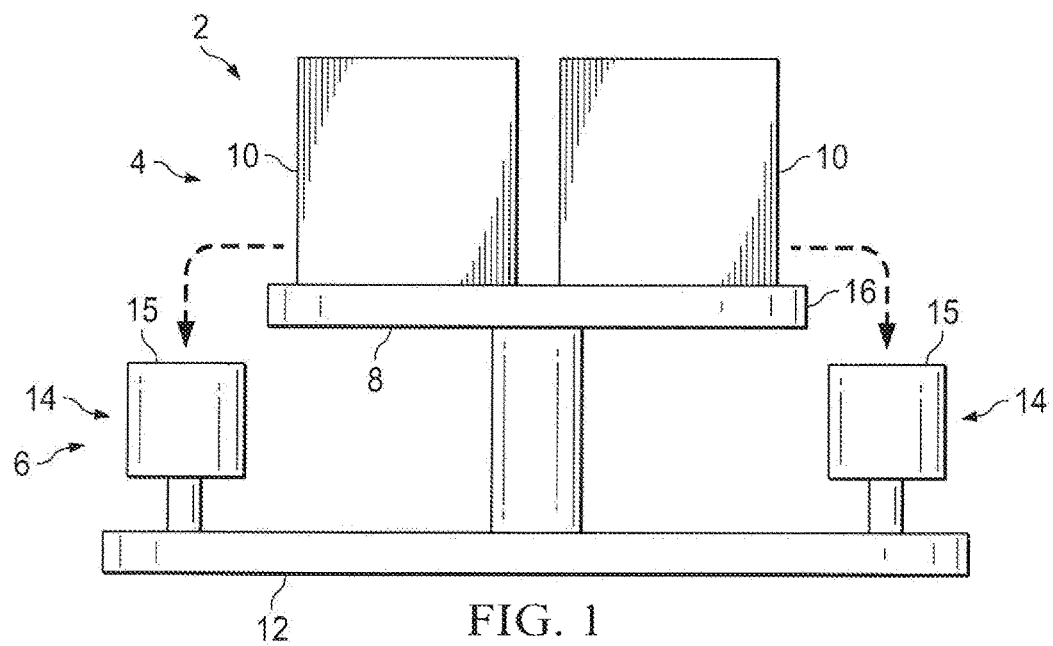
FIG. 1 is a schematic side view of an embodiment 2 of the inventive automated kitchen apparatus provided by the present invention.
Figure 2:
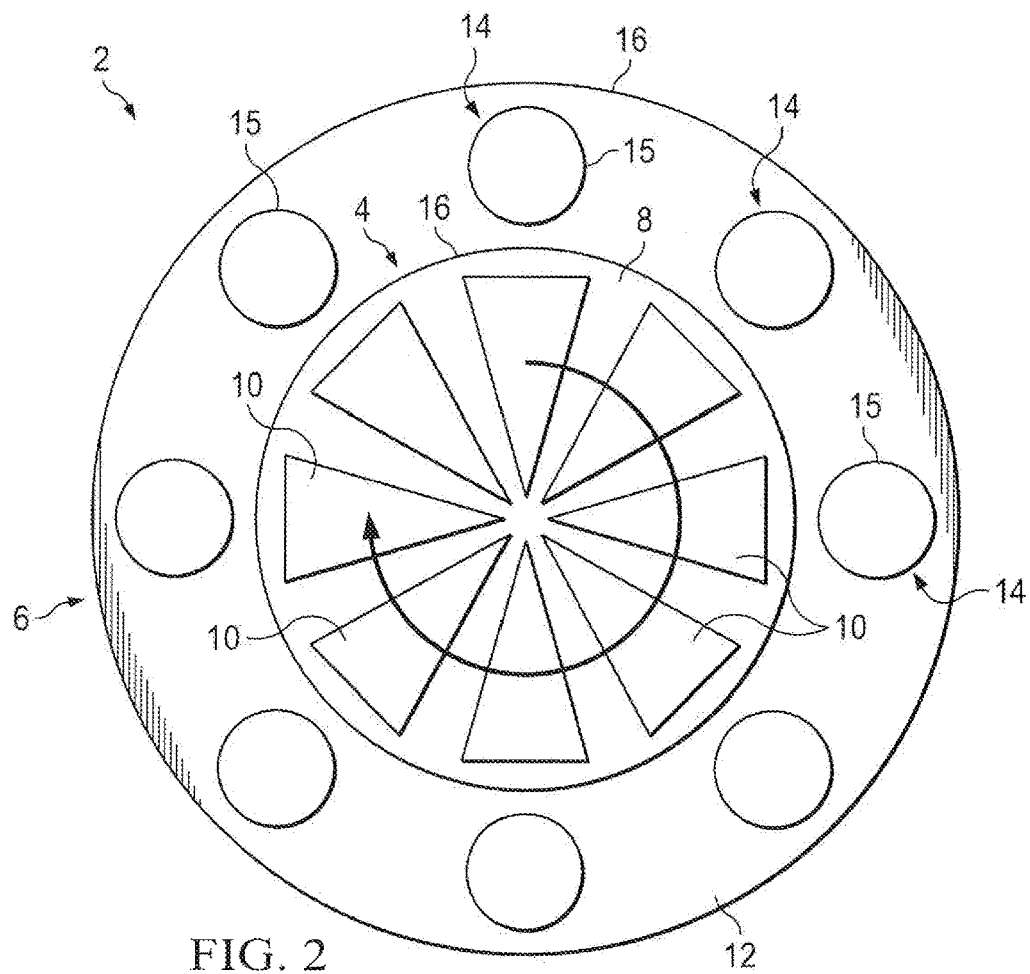
FIG. 2 is a schematic top view of the inventive kitchen apparatus 2.
Figure 3:
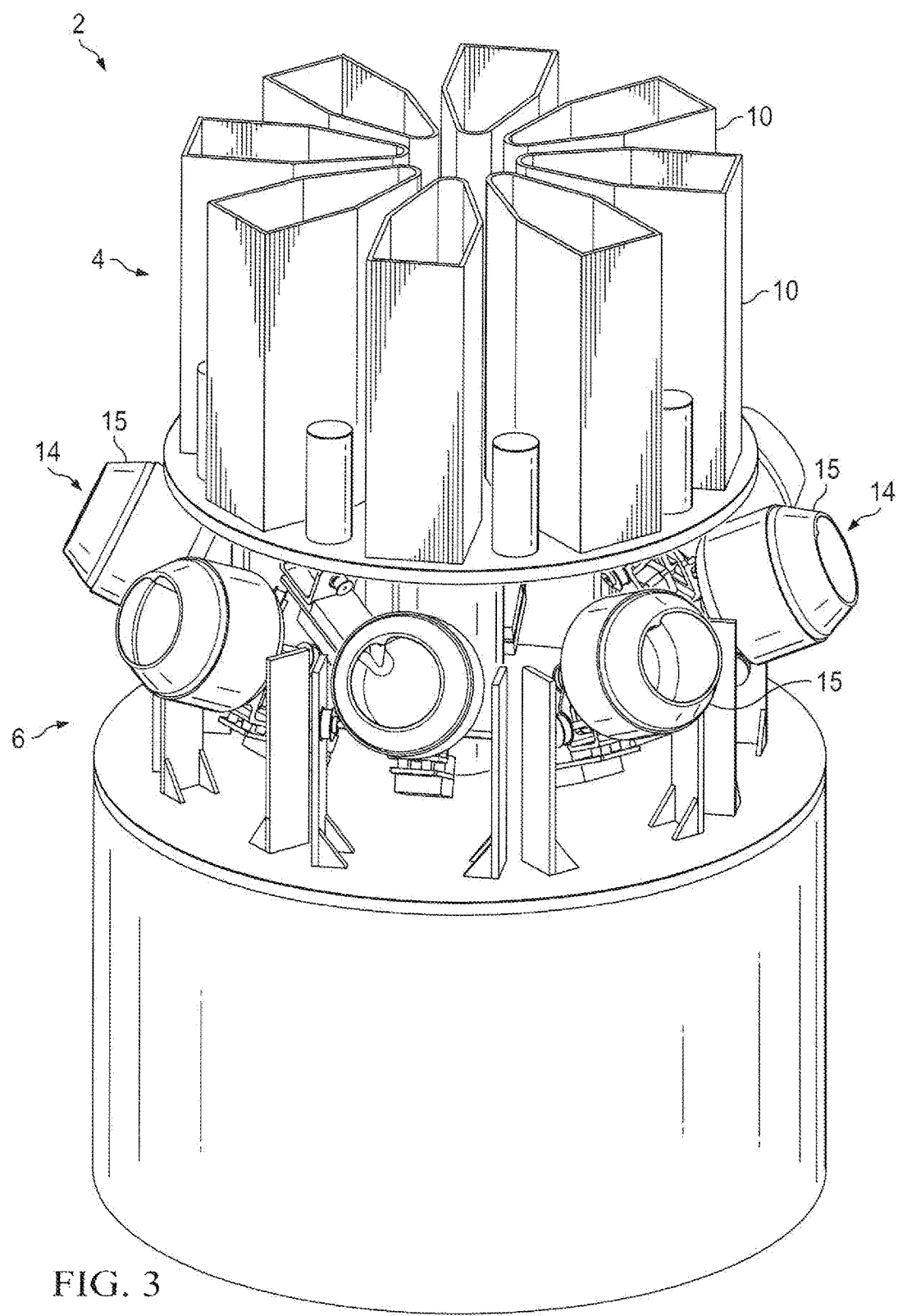
FIG. 3 is a perspective view of the inventive kitchen apparatus 2.

An embodiment 2 of the inventive automated kitchen apparatus is illustrated in FIGS. 1-6. The inventive kitchen apparatus 2 preferably comprises an upper section 4 and a lower section 6 which is positioned below the upper section 4. The upper section 4 preferably comprises (a) circular upper section support base 8 and (b) a plurality of ingredient holding and dispensing module assemblies 10 which are arranged on the upper section support base 8 in a circular array. The lower section 6 preferably comprises (a) a circular lower section support base 12 and (b) a plurality of preparation module assemblies 14 which are arranged in a circular array on the lower section support base 12.

The upper dispensing modules 10 house the various raw ingredients such as meats, vegetables, carbohydrates, fruit, sauces, etc. used in preparing the meals.

Each of the preparation module assemblies 14 includes a preparation pot 15. As viewed from above in FIG. 2, the circular array of preparation module assemblies 14 is positioned radially outward on the lower section support base 12 such that all or at least a portion of the preparation pot 15 of each cooking module assembly 14 is positioned radially beyond the outer perimeter 16 of the upper section support base 8. This allows the raw ingredients contained in the upper dispensing modules 10 to be dropped or otherwise dispensed downwardly from the dispensing modules 10 into the lower pots 15.

Figure 4:
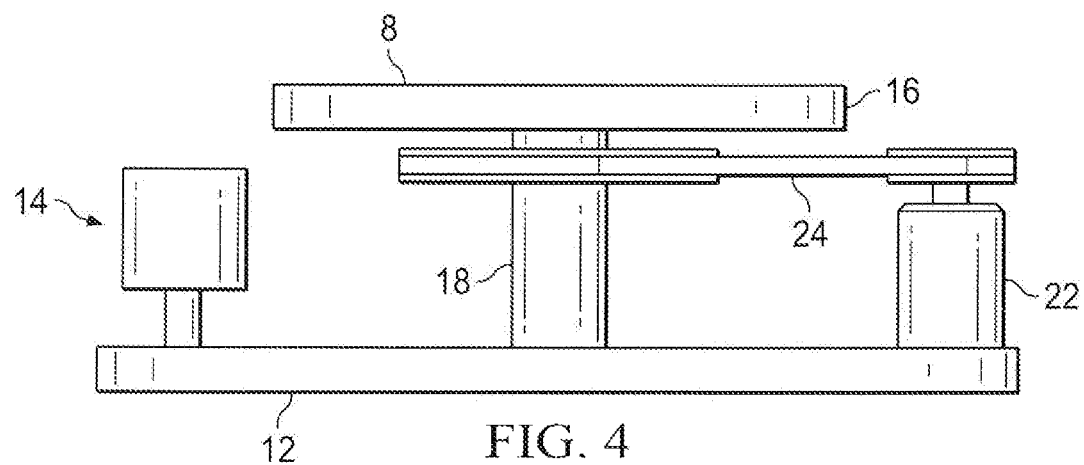
FIG. 4 is a schematic partial side view of the inventive kitchen apparatus 2.
Figure 5:
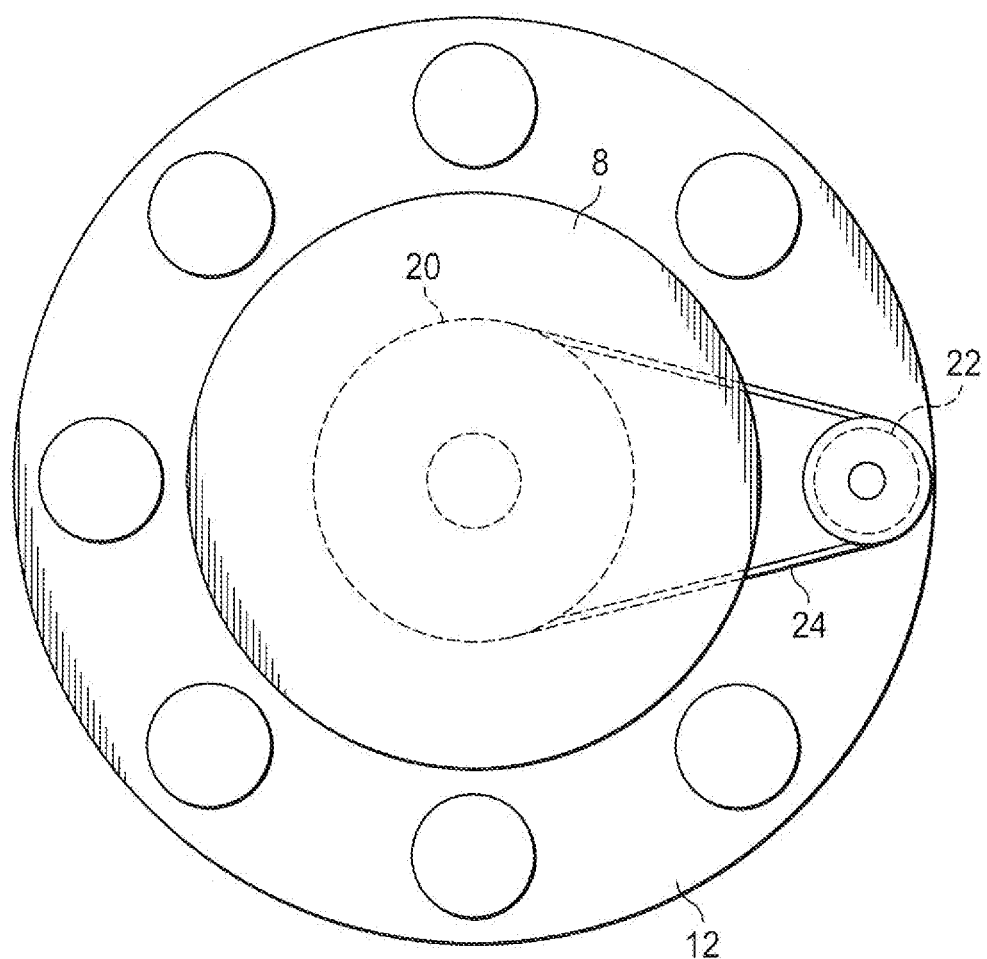
FIG. 5 is a schematic top view of the inventive kitchen apparatus 2.
Figure 6:
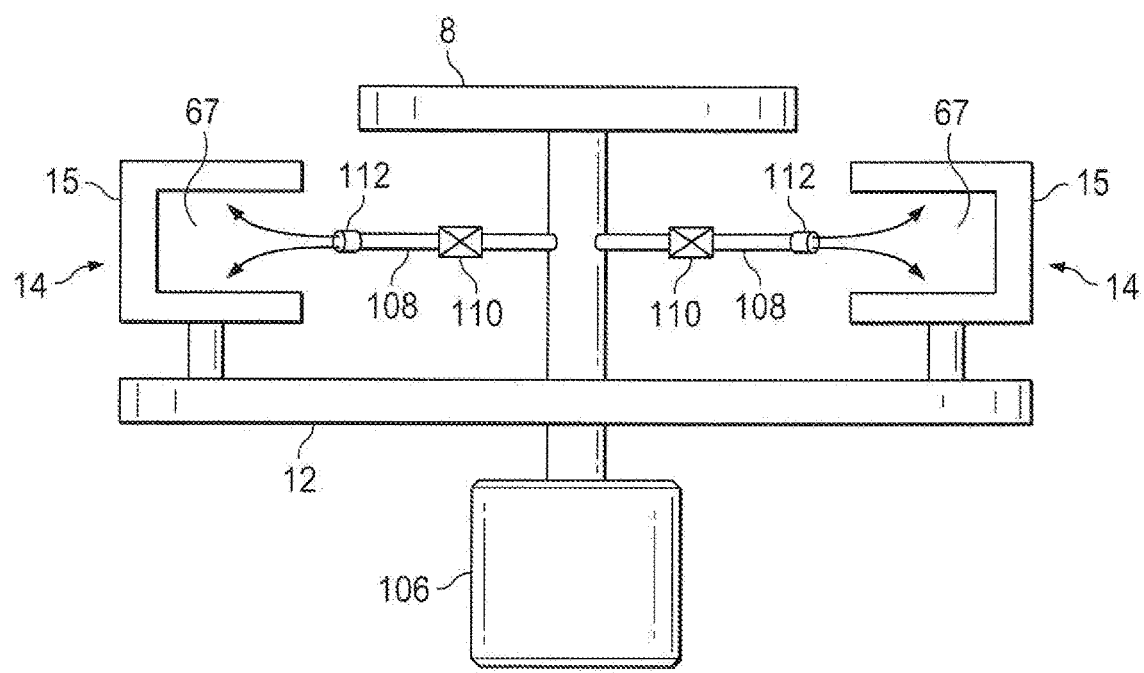
FIG. 6 is a schematic partial side view of the inventive kitchen apparatus 2.
Figure 8:
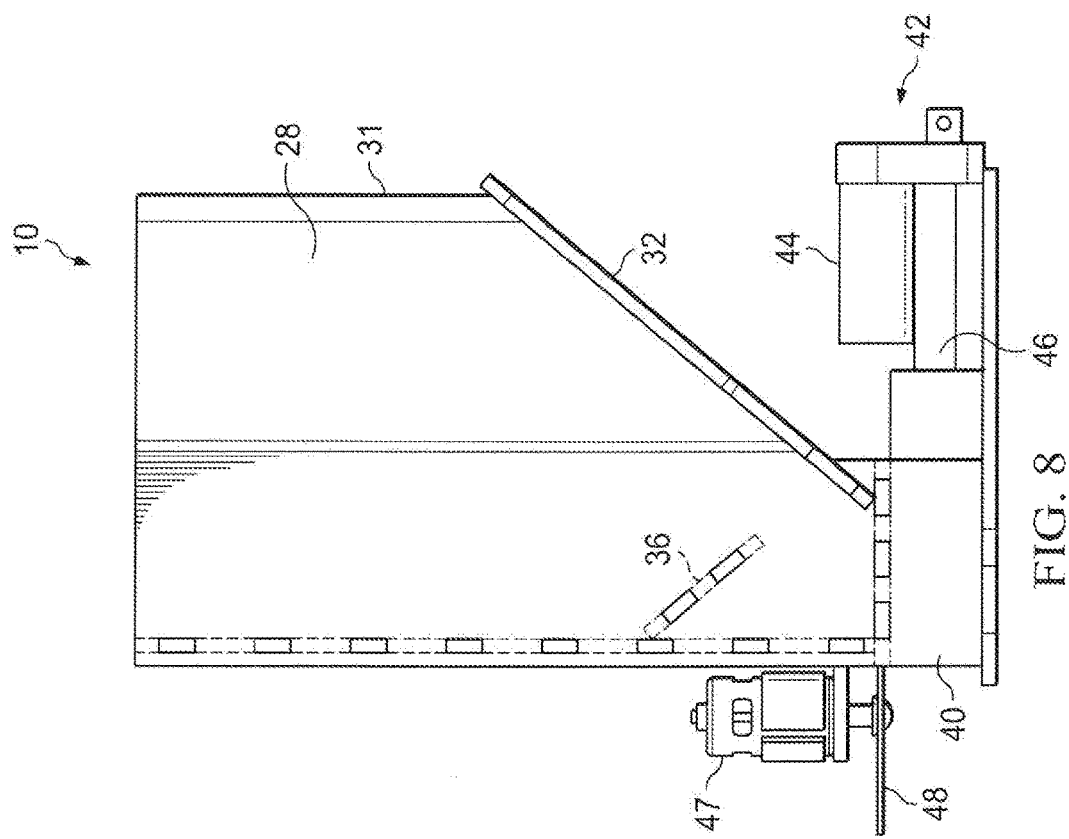
FIG. 8 is an elevational side view of the ingredient holding and dispensing module assembly 10.
Figure 7:
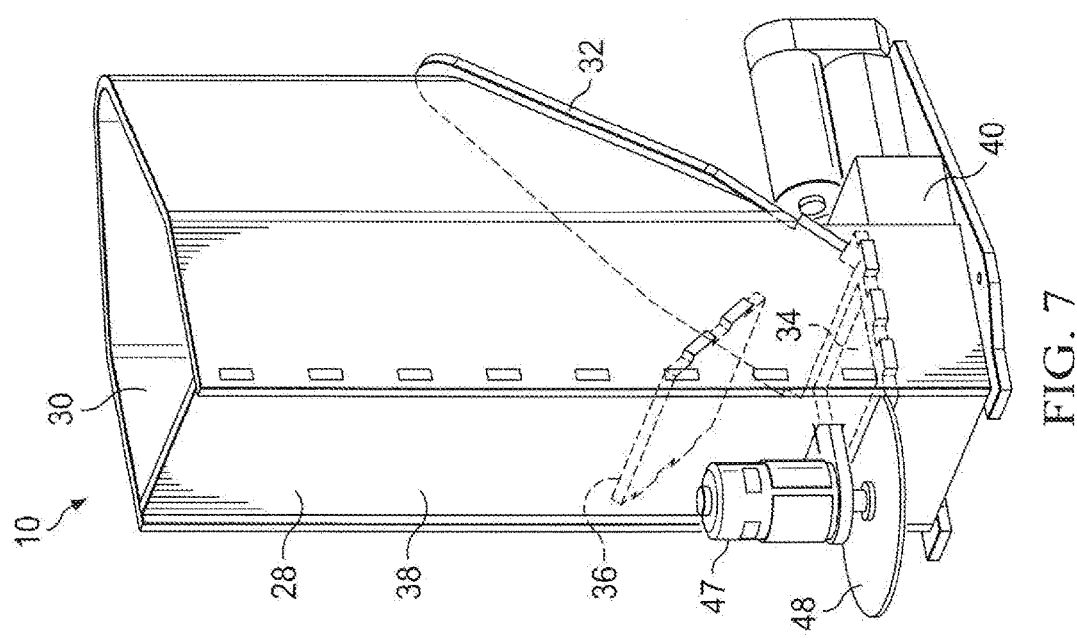
FIG. 7 is a perspective view of an embodiment 10 of an ingredient holding and dispensing module assembly provide by the present invention.

In order to allow the ingredient dispensing modules 10 to be repositioned for selectively dispensing the ingredients contained therein into any of the preparation pots 15, the upper section support base 8 operates as a turntable which can be rotated relative to the lower section 6. A rotation assembly for the upper section support base 8 is illustrated in FIGS. 4-5 wherein: the upper section support base 8 is mounted on the upper vertical end of a rotatable support shaft 18; a drive pulley 20 is positioned on the support shaft 18; and the drive pulley 20 is linked to a drive motor 22 by a timing belt 24. An incremental encoder (not shown) located on the shaft of the drive motor 22 tracks the position of the upper section support base 8. Position control for the upper section support base will preferably be implemented in the software for the system's main microcontroller 26 discussed below.

Alternatively, it will be understood that the support shaft 18 can be directly driven for rotating the upper section support base 8, or can be indirectly driven in an alternative manner. In addition, it will be understood that even further alternatives can be implemented wherein, for example: (a) the lower section support base 12 can be mounted and driven for rotation with respect to the upper section 4; (b) the upper section 4 and the lower section 6 can each be stationary with an ingredient transfer assembly rotatably mounted therebetween; (c) the upper section support base 8 and the lower section 6 can each be stationary with the dispensing modules 10 mounted for rotation on the upper section support base 8; or (d) the upper section 4 and the lower section support base 12 can each be stationary with the preparation module assemblies 14 mounted for rotation on the lower section support base 12.

Each upper dispensing module assembly 10 can hold a meat, vegetable, carbohydrate, fruit, or other ingredient, or a mixture thereof, and is operable to for dispensing the ingredient into the preparation pots 5. Each dispensing module 10 preferably includes a clear container 28 for visibly holding the ingredient. Similar to a cereal dispenser, the container 28 preferably comprises: an open or openable top 30; a back wall 31 having a lower portion 32 that slopes downwardly in a forward direction to funnel the ingredient into a forward bottom discharge opening 34 of the container 28; and an interior plate 36 attached to a front wall 38 of the container 28. The interior plate 36 slopes downwardly and rearwardly toward the sloped lower portion 32 of the back wall 31 and further assists in promoting the downward flow by gravity of the ingredient into the bottom discharge 34 of the container 28.

Each dispenser module 10 preferably also comprises: a dispensing tray 40 which is slideably positioned beneath the bottom discharge opening 34 of the container 28 for receiving and dispensing a controlled amount of the ingredient. A linear actuator 42 comprising a DC motor 44 which drives a lead screw 46 which is connected to the tray 40. The linear actuator is operable for pulling the tray 40 rearward for loading the tray 40 with the ingredient and pushing the tray 40 forward for dispensing the ingredient from the tray 40 into a preparation pot 15. In order to prevent jamming, as the linear actuator 42 pushes the tray 40 forward for dispensing the ingredient, a horizontal spinning blade 48 cuts oversized pieces of the ingredient projecting from the top of the tray 40. The horizontal blade 48 is driven by a small DC motor 47 mounted on the exterior of the front wall 38 of the container 28.

Figure 24:
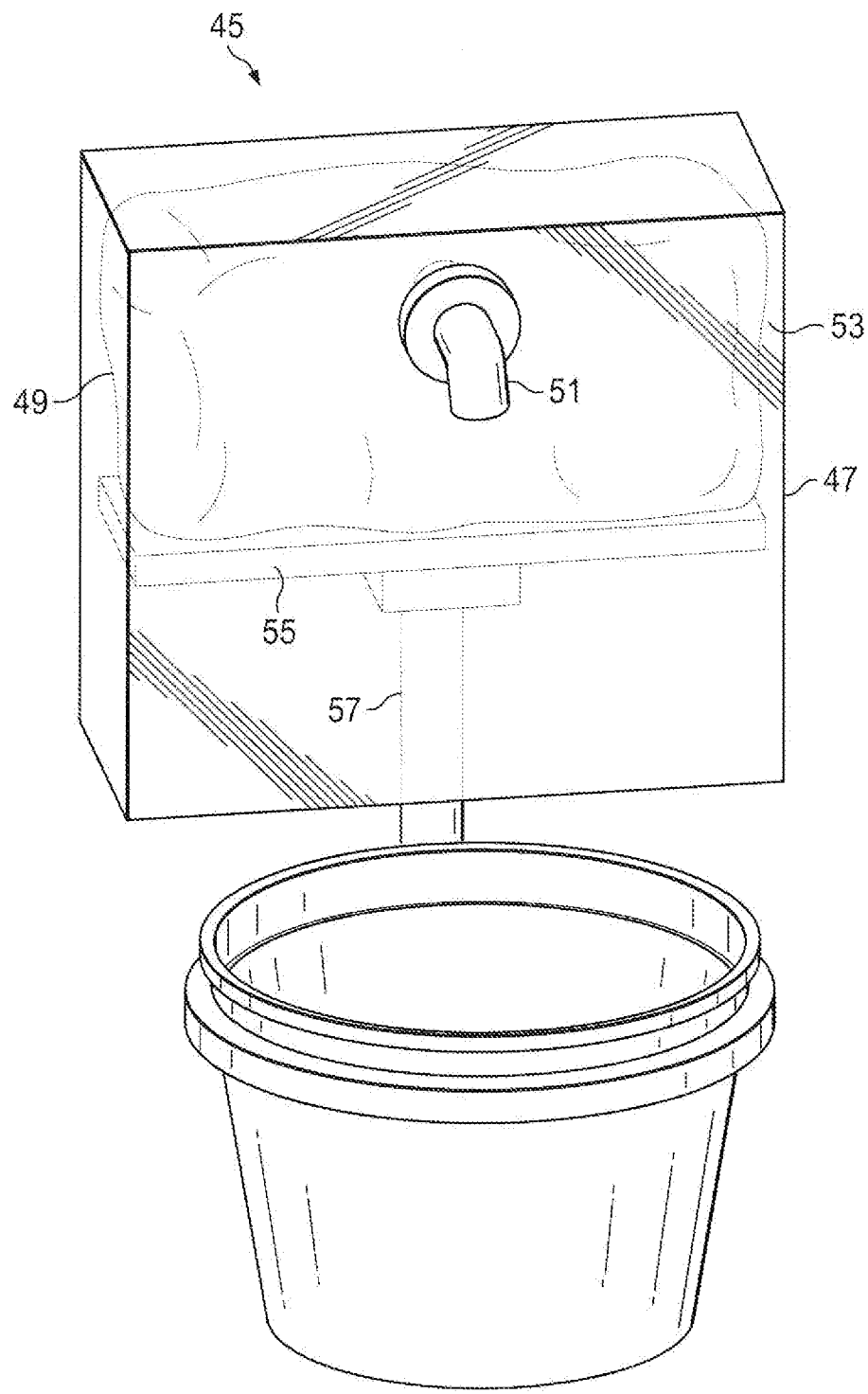
FIG. 24 is an elevational front view of a liquid dispensing module 45.

An alternative dispensing module 45 for dispensing oils, sauces, creams or other liquid or flowable semi-liquid ingredients into the preparation pots 15 is shown in FIG. 24. The alternative liquid dispensing module 45 comprises: a clear container 47 in which a bag 49 containing the liquid or semi-liquid ingredient is placed; a flow spout 51 to which the bag 49 is connected and which projects through the front wall 53 of the container 47; a movable base plate 55, inside the container 47 and beneath the bag 49, which can be selectively raised and lowered; and an electric or other actuator having a piston or operating shaft 57 which acts against the bottom of the movable base plate 55 to move the base plate 55 upward in set increments to thereby squeeze the bag 49 sufficiently to cause the desired amount of the liquid or semi-liquid ingredient to flow out of the spout 51. The upward displacement of the base plate 55 is controlled at a rate which causes all of the flow of the ingredient from the spout 51 to fall into the preparation pot 15.

Each preparation module assembly 14 preferably comprises (a) two vertical support legs 52 and 54 having lower ends 56 and 58 which are mounted on the lower section support base 12 of the inventive kitchen 2 and (b) a support frame 60 for the preparation pot 15 which is mounted between the vertical support legs 52 and 54. A drive shaft 62 extends from the rearward end of the preparation pot 15 and is rotationally mounted in the support frame 60 so that the preparation pot 15 can be turned about a rotational (primary) axis 64 when the pot 15 is being used for mixing, or for both cooking and mixing, and when the pot 15 is being cleaned. In addition, the support frame 60 is gimbaled or otherwise rotationally mounted between the support legs 52 and 54 so that the support frame 60 and the preparation pot 15 can be rotated about a secondary axis 65. The secondary axis 65 for the pot support frame 60 is perpendicular to the rotational primary axis 64 of the pot 15.

The preparation module assembly 14 also preferably comprises: (1) a DC motor 66 which is mounted in the support from 60 and is linked to the drive shaft 62 of the preparation pot 15 by gears 68 and 70 or by a belt and pulley arrangement for turning the pot 15 about the primary axis 64 and (2) a burner 72 secured by the support frame 60 outside of the substantially cylindrical side wall 74 of the of the pot 15 such that the burner 72 will preferably be positioned substantially beneath the pot 15 when the pot is used for cooking.

It will be understood, however, that (a) the burner 72 can be positioned at any other desired position or orientation adjacent to the pot 15 when the pot 15 is in its cooking position, (b) the preparation module assembly 14 can be operated with the burner turned off when used for mixing a salad or other non-cooked meal or entree, and (c) some or all of the preparation module assemblies can be constructed without burners 72 for mixing salads or other non-cooked products.

Consequently, the preparation module assembly 14 comprises a preparation pot 15 that spins around its primary axis 64, and gimbals between a desired set of orientations to achieve required tasks. The cooking pot 15 is preferably gimbaled to these desired orientations by a stepper motor 76 which is secured to the stationary support leg 54 and is operably linked to the cooking pot support frame 60 by a drive gear arrangement 78 or by a belt and pulley.

Figure 10:
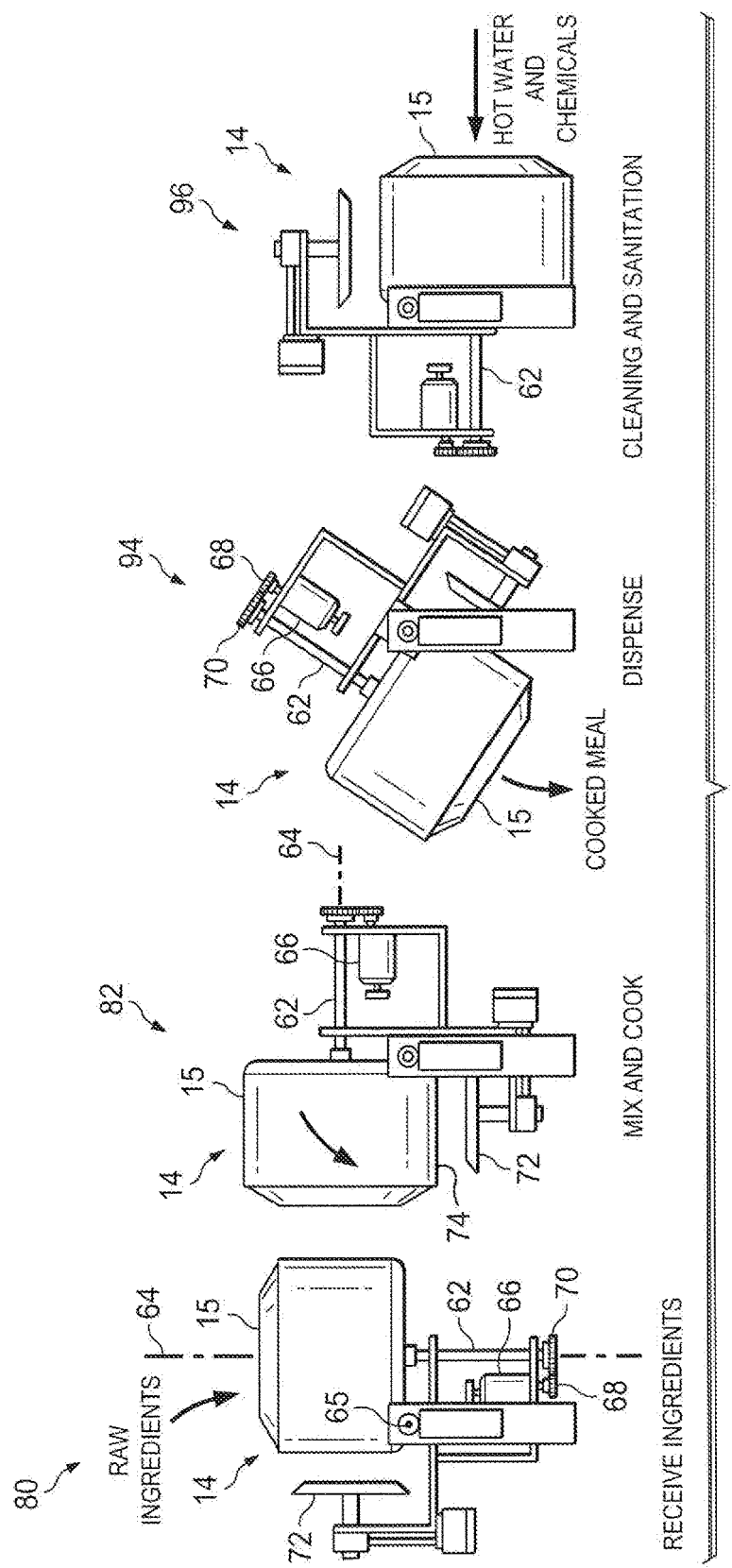
FIG. 10 is a sequential illustration of the preparation assembly 14 in its loading, cooking, serving, and cleaning orientations.

The four rotational positions of the cooking module assembly 14 for a full mixing and/or cooking and cleaning cycle are illustrated in FIG. 10. In its initial loading orientation 80, the rotational primary axis of 64 of the preparation pot 15 is preferably pointing vertically upwards, or can be at any other desired loading orientation, so that raw ingredients can be dropped into or otherwise placed in the cavity 67 of the pot 15. After the pot 15 has been loaded with all of the ingredients needed for the particular meal selected, the pot 15 gimbals to a cooking and/or mixing orientation 82, preferably facing the consumer, which is preferably in a range of from about 60° to 90° from vertical. When the pot 15 is moved to the cooking and/or mixing orientation 82, the pot 15 begins to spin about its primary axis 64 and, when cooking, the burner 72 is automatically ignited. To assist in retaining the ingredients in the cooking pot 15 when the pot 15 is moved to the cooking and/or mixing orientation 82, the forward end 84 of the pot 15 tapers inwardly so that the diameter of the forward opening 86 of the pot 15 is less than the inside diameter of the remainder of the cavity 67 of the pot 15.

In addition, the pot 15 preferably includes a mixing fin 90 which extends longitudinally through the interior of the pot 15 along the interior side wall 92. As the ingredients are tumbled in the pot 15 when mixing or both cooking and mixing, the ingredients are contacted, disrupted and mixed by the longitudinal fin 90. The longitudinal mixing fin 90 projects radially inward from interior side wall 92 into the cavity 67 of the pot 15 a distance which is preferably in the range of from about 1 cm to about 6 cm.

When the cooking and/or mixing operation is complete, the pot 15 gimbals to a serving orientation 94 which is preferably from about 120° to about 180°, more preferably about 160° from vertical so that the food will fall onto a plate or into a bowl, carton or other receptacle for eating. At this point, if it is necessary to mix or both cook and mix more ingredients to complete the meal, the pot 15 is returned to its initial loading orientation 80 and the loading, cooking and serving steps can be repeated. If the meal is complete, the pot 15 gimbals to a cleaning orientation 96 which is preferably in the range of from about 180° to about 300°, more preferably about 270° from vertical, where the interior of the pot 15 is sprayed with an aqueous cleaning solution and rinsed while spinning.

Figure 9:
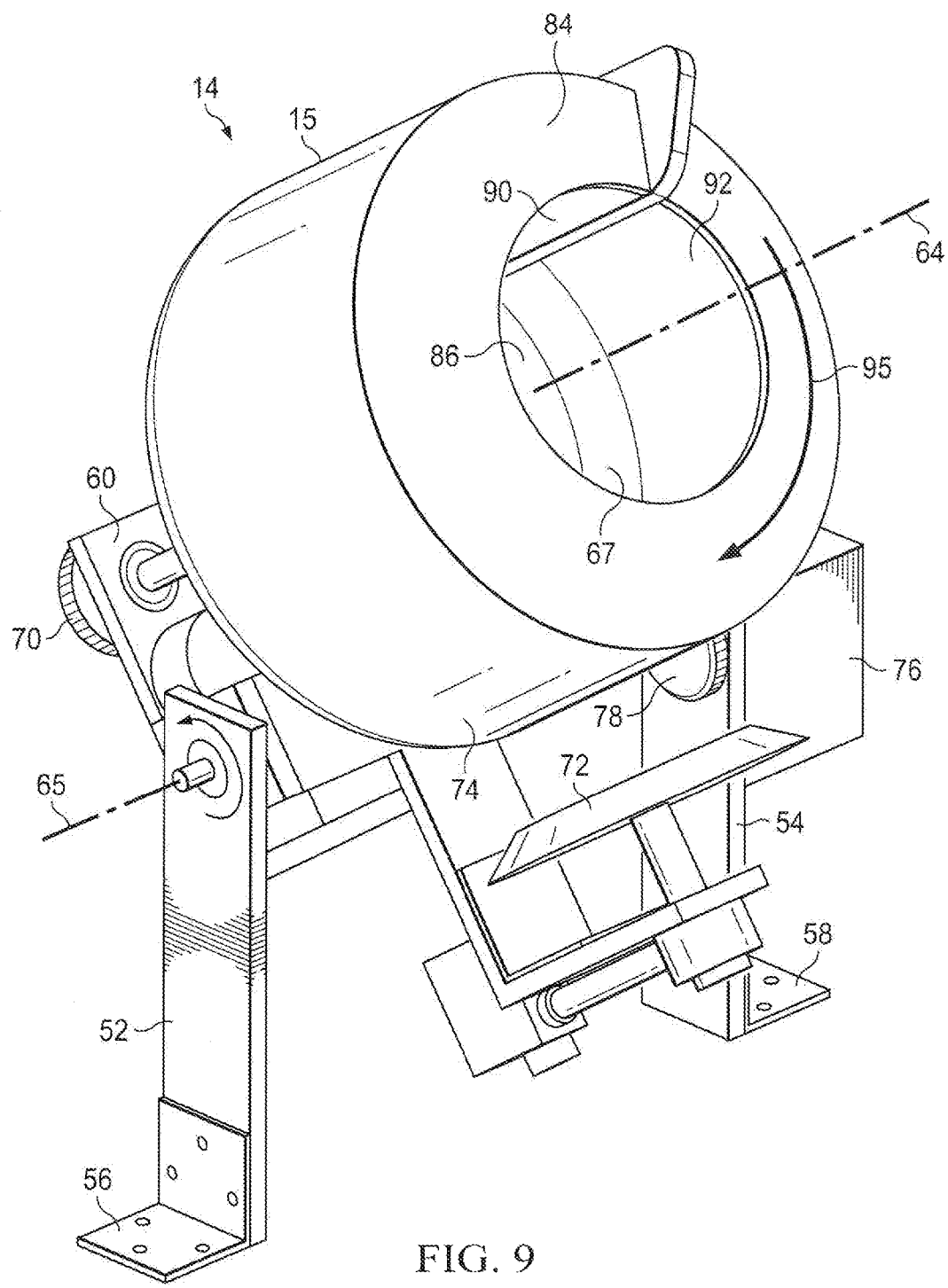
FIG. 9 is a perspective view of an embodiment 14 of a preparation module assembly used in the inventive kitchen.
Figure 11:
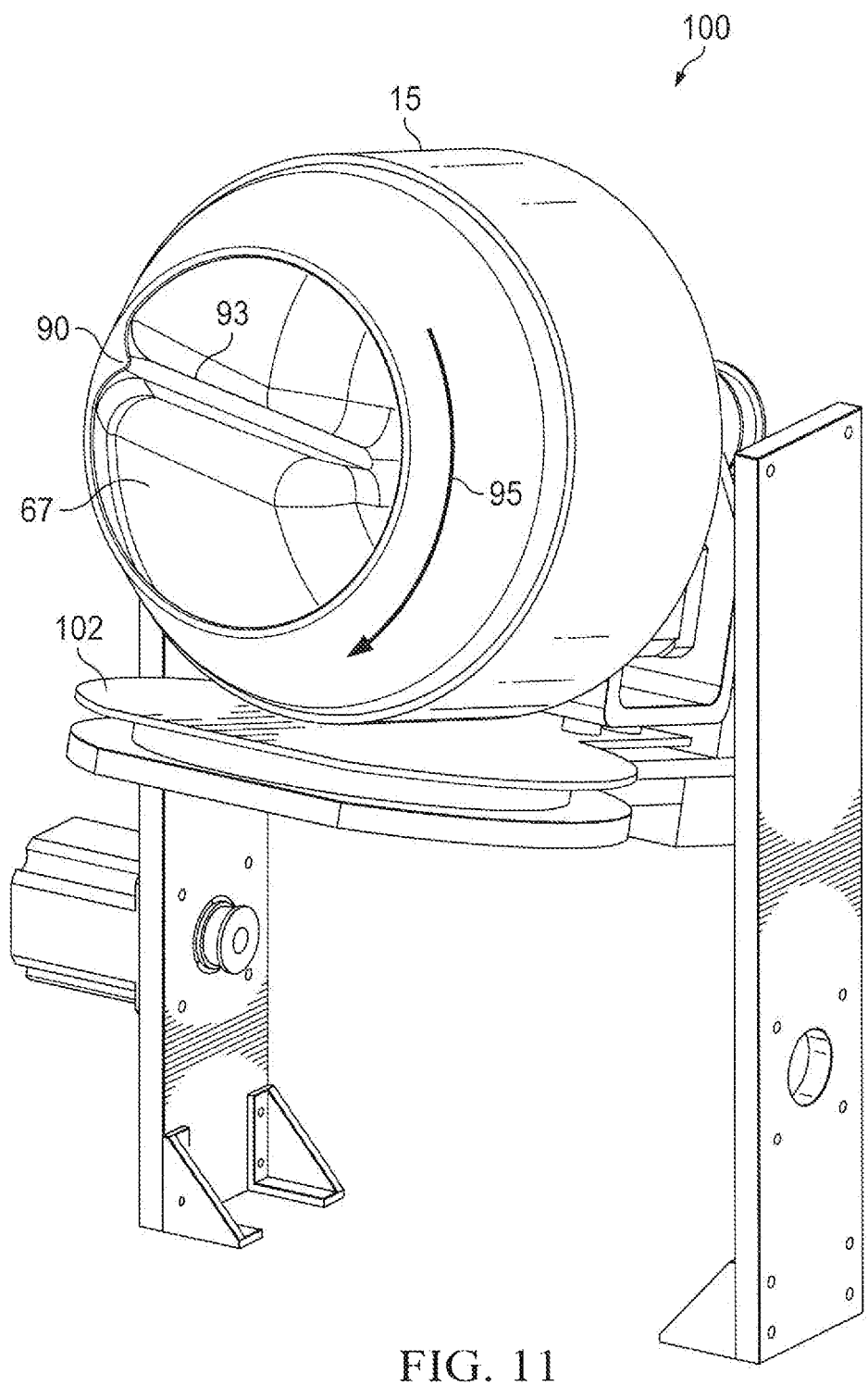
FIG. 11 is a perspective view of an alternative embodiment 100 of the preparation module assembly.
Figure 12:
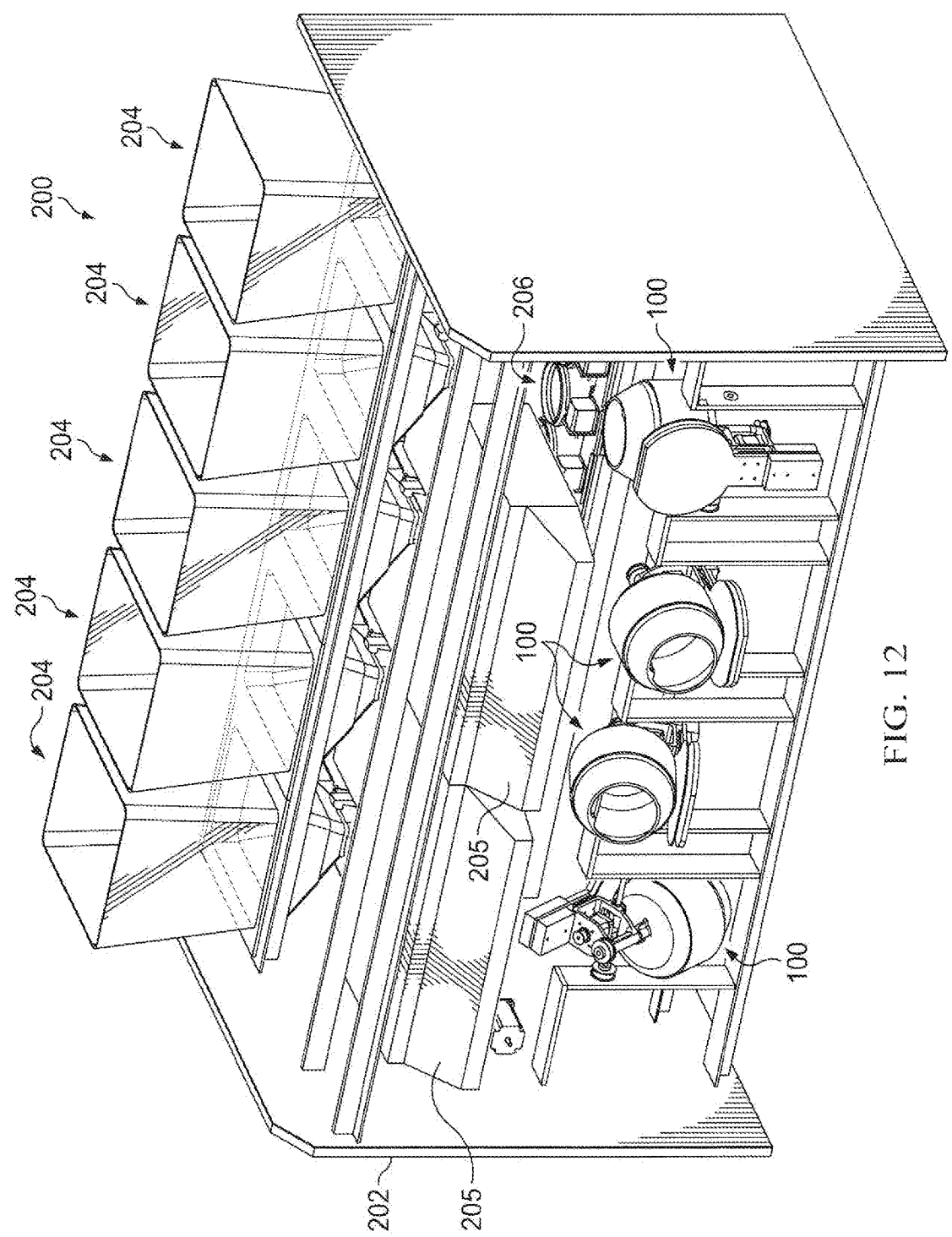
FIG. 12 is a perspective view of an alternative embodiment 200 of the inventive kitchen.

The interior cavity 67 of each preparation pot 15 will preferably be lined with Teflon or other non-stick cooking material. Also, as illustrated in FIG. 11, the contacting surface 93 (i.e., the leading surface in the direction of rotation 95 of the pot 15) of the longitudinal mixing fin 90 used in each pot 15 can be a straight surface as illustrated in FIG. 9 or a curved surface as illustrated in FIG. 11 which preferably extends from the interior surface 92 of the cavity 67 at an angle which is angled away from the direction of rotation 95 of the pot 15. As illustrated in FIG. 11, the lateral cross-section of each mixing fin 90 extending from the interior wall 92 of the cavity 67 of the pot 15 toward the center of the pot 15 will preferably have an inverted V shape wherein the sides of the inverted V can be straight or curved.

An alternative embodiment 100 of the preparation module assembly is illustrated in FIG. 11. In the alternative cooking module assembly 100, the gas burner 72 described above is replaced with a safer and more efficient induction stove 102. In this embodiment, the cooking pot 15 is preferably formed of stainless steel so that, by creating a rapidly changing magnetic field using the table top induction element 102 positioned beneath or otherwise adjacent to the side wall of the stainless steel pot 15, eddy currents are induced in the metal, cause the cooking pot 15 to heat up quickly.

Each preparation module assembly 14, 100 preferably also includes temperature and weight sensors in order to implement feedback control. For sensing temperature, the preparation module assembly 14, 100 preferably includes an infrared temperature sensor, located behind the pot 15 when the pot 15 is in its cooking orientation 82. For sensing the weight of the ingredients, load cells can be used, for example, as will be discussed below.

By monitoring the temperature of the pot 15 and the weight of the ingredients in the pot 15, the optimal cook time can be calculated and calibrated for different ingredients by the kitchen control program. This will ensure that all meals are cooked thoroughly without being overcooked. The control program is preferably implemented in software on the system's main microcontroller 26.

For cleaning the preparation pots 15 when the pots 15 are rotated to the cleaning orientation 96, the inventive kitchen apparatus 2 preferably includes an electric pump 106 that pressurizes heated soapy water to a pressure suitable for spray cleaning, preferably about 100 psi. A series of PVC pipes 108 and actuated valves 110 and spray nozzles 112 will control the flow of the fluid and spray the interior cavities 67 of the pots 15 when required.

Figure 23:
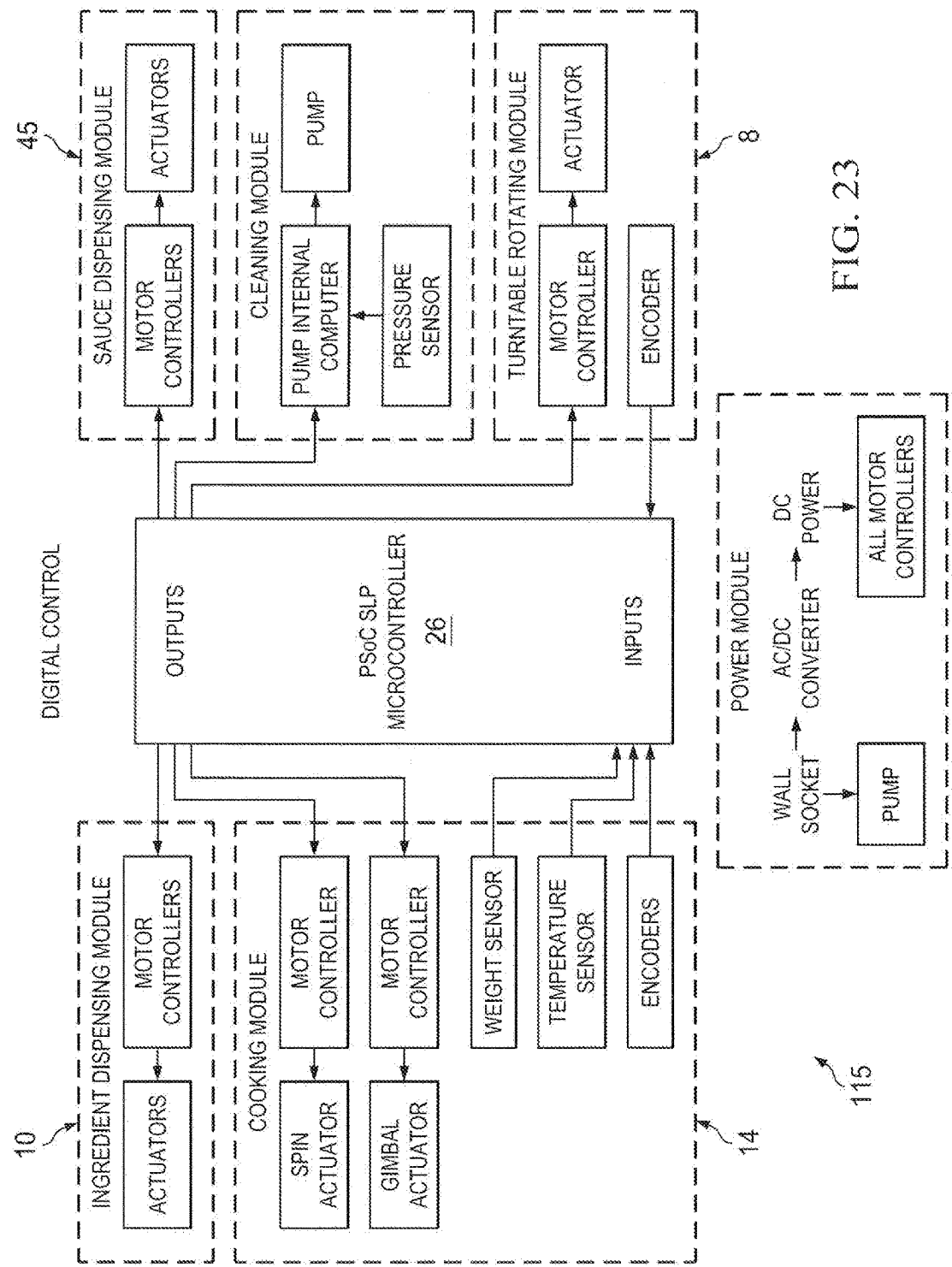
FIG. 23 illustrates a programmed control architecture for automating and controlling the inventive kitchen 2.

The overall control architecture 115 for automating and controlling the inventive kitchen apparatus 2 is illustrated in FIG. 23. The system's main microcontroller 26 will preferably be a PSoC 5LP microcontroller, manufactured by Cypress Semiconductor. The main advantage of this package is that it has programmable digital logic, which allows for extremely fast electronics prototyping. It also has the hardware capabilities required to control several actuators and read from multiple sensors at a fast rate.

All of the actuators used in the system 26 will preferably be brushed electric motors, which will simplify the electronic systems. The motor controllers will preferably be hobbyist level motor controllers. Communication between the microcontroller 26 and the motor controllers will preferably be via a PWM signal. The sensors and the encoders will preferably communicate with the microcontroller 26 via analog signals. The closed loop control for the rotating upper section 4 of apparatus 2 and the cooking mechanism will preferably both be implemented in software as simple PID controllers. All of the electronic components will preferably be powered using a DC power source that plugs into a wall socket, with the exception of the pump 106 which will preferably be powered directly from a wall socket. The microcontroller 26 will communicate the desired pressure to the pump 106, which will then be maintained by the pump's internal computer.

An alternative embodiment 200 of the inventive automated kitchen apparatus is shown in FIGS. 12-17. In contrast to the rotating embodiment 2 described above, the inventive kitchen apparatus 200 is a linear embodiment which comprises: a kitchen housing 202; a plurality of preparation module assemblies 100, as described above, mounted in a linear row across a forward lower portion of the housing 202; a plurality of ingredient holding and dispensing modules 204 mounted in a linear row across a rearward upper portion of the housing 202 (i.e., such that the dispensing modules 204 are preferably above and behind the preparation module assemblies 100); and a linear sliding transfer assembly 206 extending centrally across the housing 200 between the row of preparation module assemblies 100 and the row of dispensing modules 204.

The preparation module assemblies 100 used in the inventive kitchen apparatus 200 can alternatively be preparation module assemblies 14 of the type described above. The preparation module assemblies 100 or 14 operate in the same manner as describe above for kitchen 2 for receiving ingredients, mixing, cooking, and dispensing the meal or other food product, and cleaning.

Figure 15:
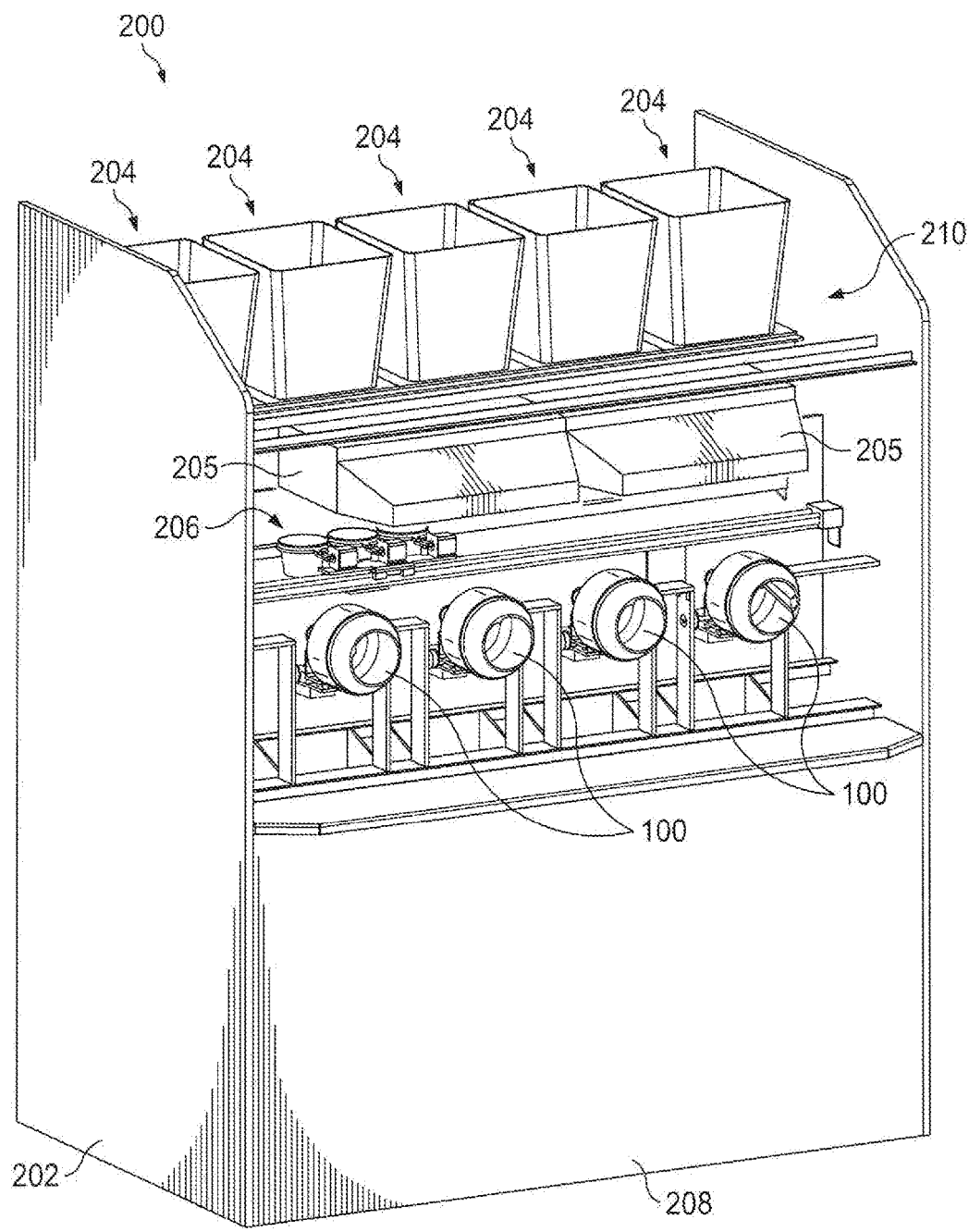
FIG. 15 is a perspective view of the inventive kitchen apparatus 200.

In FIG. 15, the automated kitchen 200 is shown wherein: the kitchen housing 202 also includes a lower cabinet 208; the upper portion 210 of the housing 202 is enclosed for refrigerating the ingredient holding and dispensing modules 204; and one or more ventilation hoods 205 is/are mounted above the preparation assemblies 100 for filtering and venting the vapors produced in the cooking process.

Figure 13:
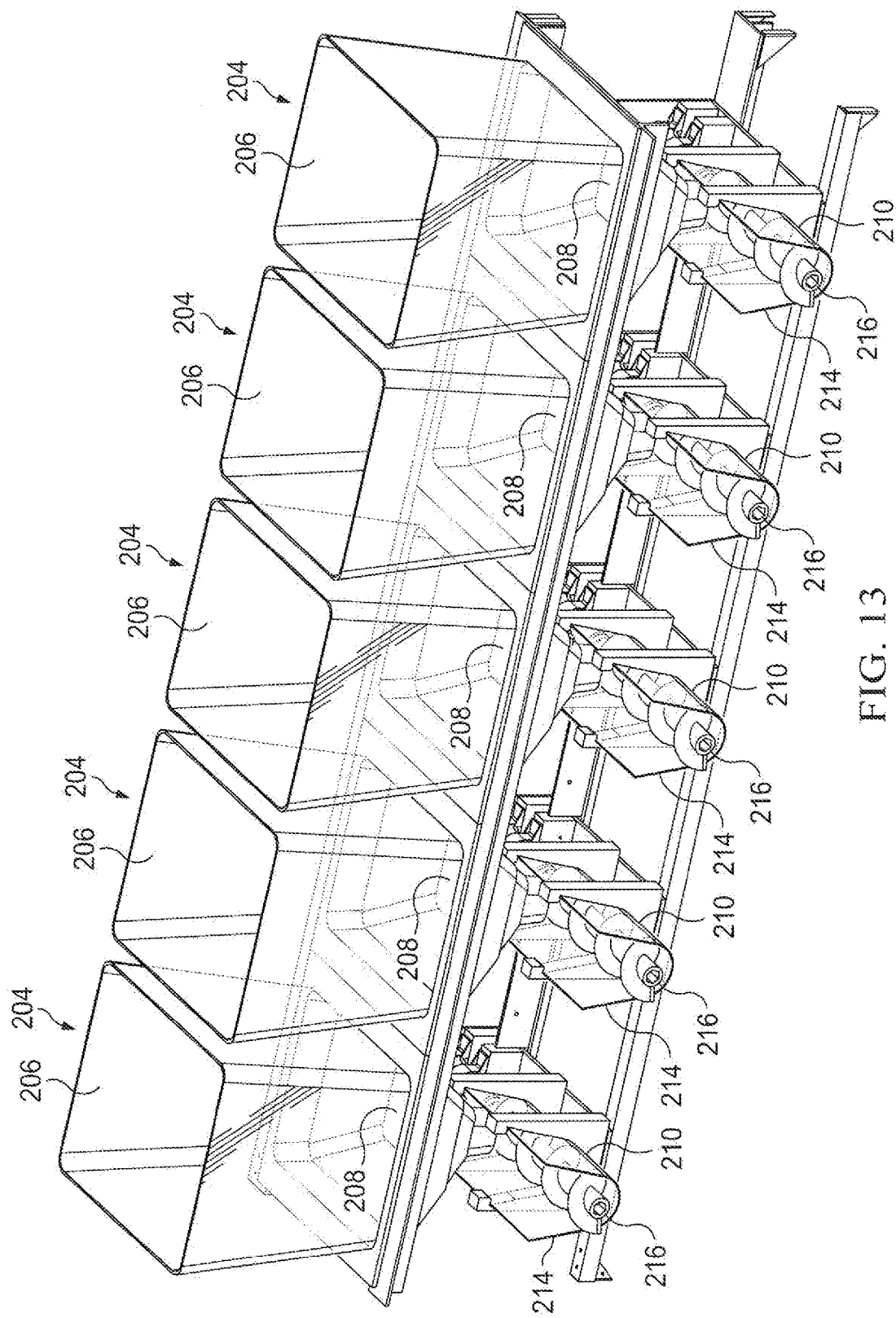
FIG. 13 is a perspective view of a linear array of ingredient holding and dispensing module assemblies 204 used in the inventive kitchen apparatus 200.
Figure 14:
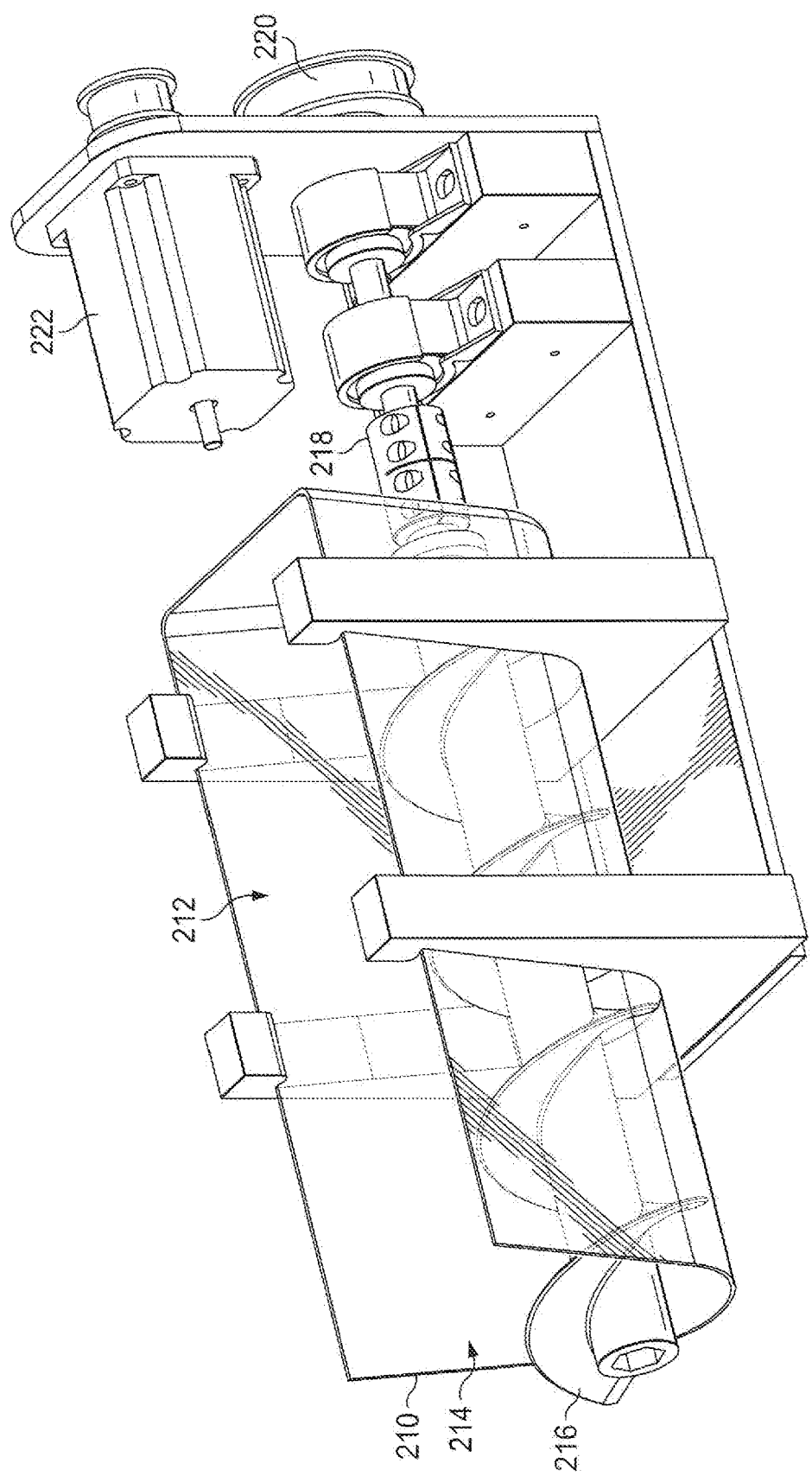
FIG. 14 is a perspective view of a lower dispenser portion of a holding and dispensing assembly 204.

The ingredient dispensing module assemblies 204 can be identical to dispensing modules 10 described above. Alternatively, as illustrated in FIGS. 13 and 14, each of the ingredient dispensing modules 204 will preferably comprise: (a) a clear plastic container 206 for holding an ingredient, the container 206 having a bottom delivery spout 208 of reduced size; (b) a substantially horizontally extending U-tube 210 mounted below the container 206, the U-tube 210 having a diverging U-shaped cross-sectional shape, an open top 212 in which the bottom spout 208 of the container 206 is received, and an open forward (discharge) end 214; (c) an auger 216 positioned in the bottom of the U-tube 210; (d) a rearwardly extending, rotatably mounted drive shaft 218 for the auger 216 having a pulley 220 or a gear mounted on the rearward end thereof; and a stepper motor 222 mounted for engaging the auger drive shaft 218 by a belt or gear arrangement. The stepper motor 222 is operable for rotating the auger 216 by an amount to cause the auger 216 to discharge a set quantity of the ingredient from the open forward end 214 of the U-tube 210.

Figure 16:
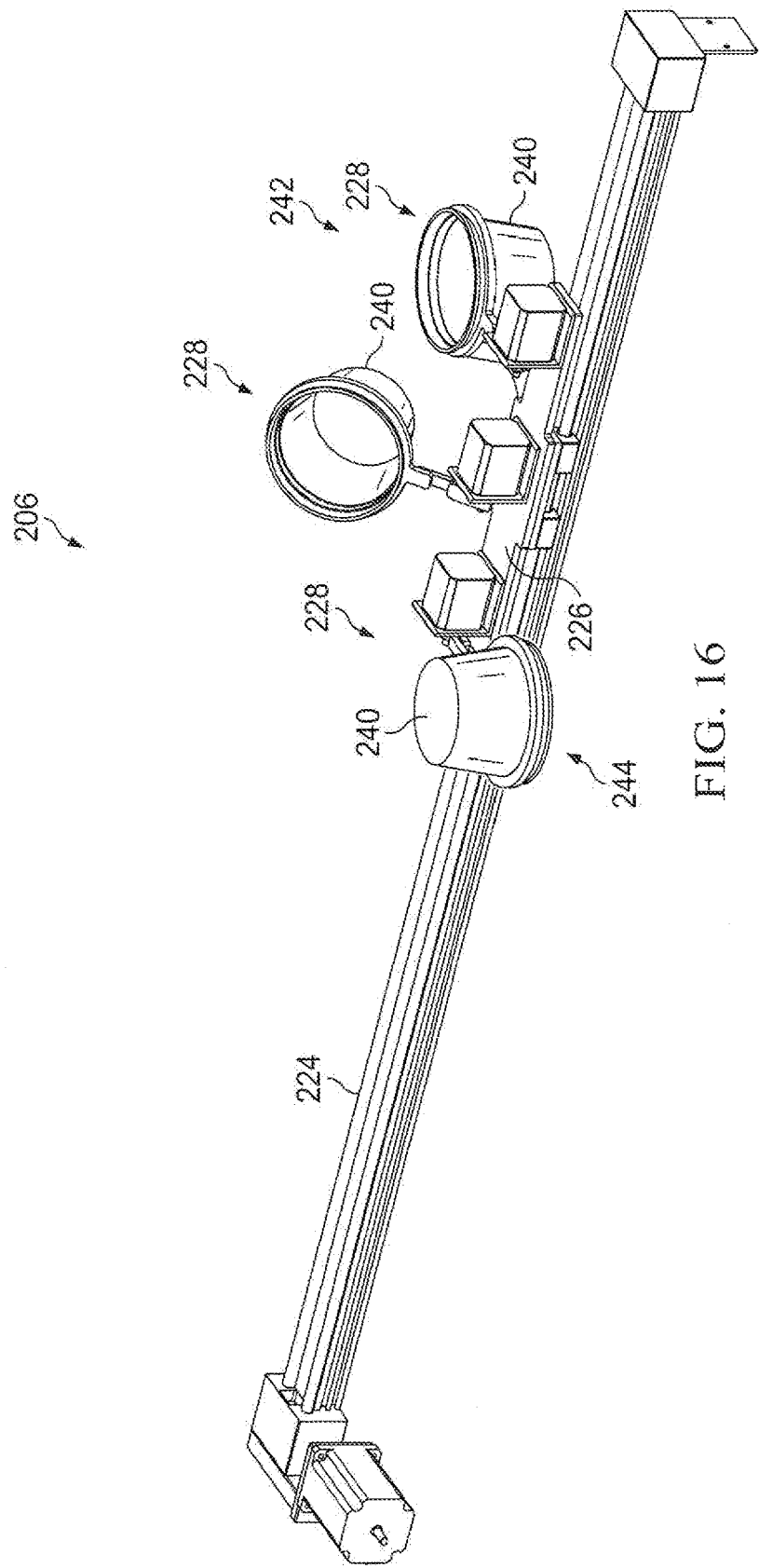
FIG. 16 is a perspective view of a linear sliding transfer assembly 206 used in the inventive kitchen apparatus 200.
Figure 17:
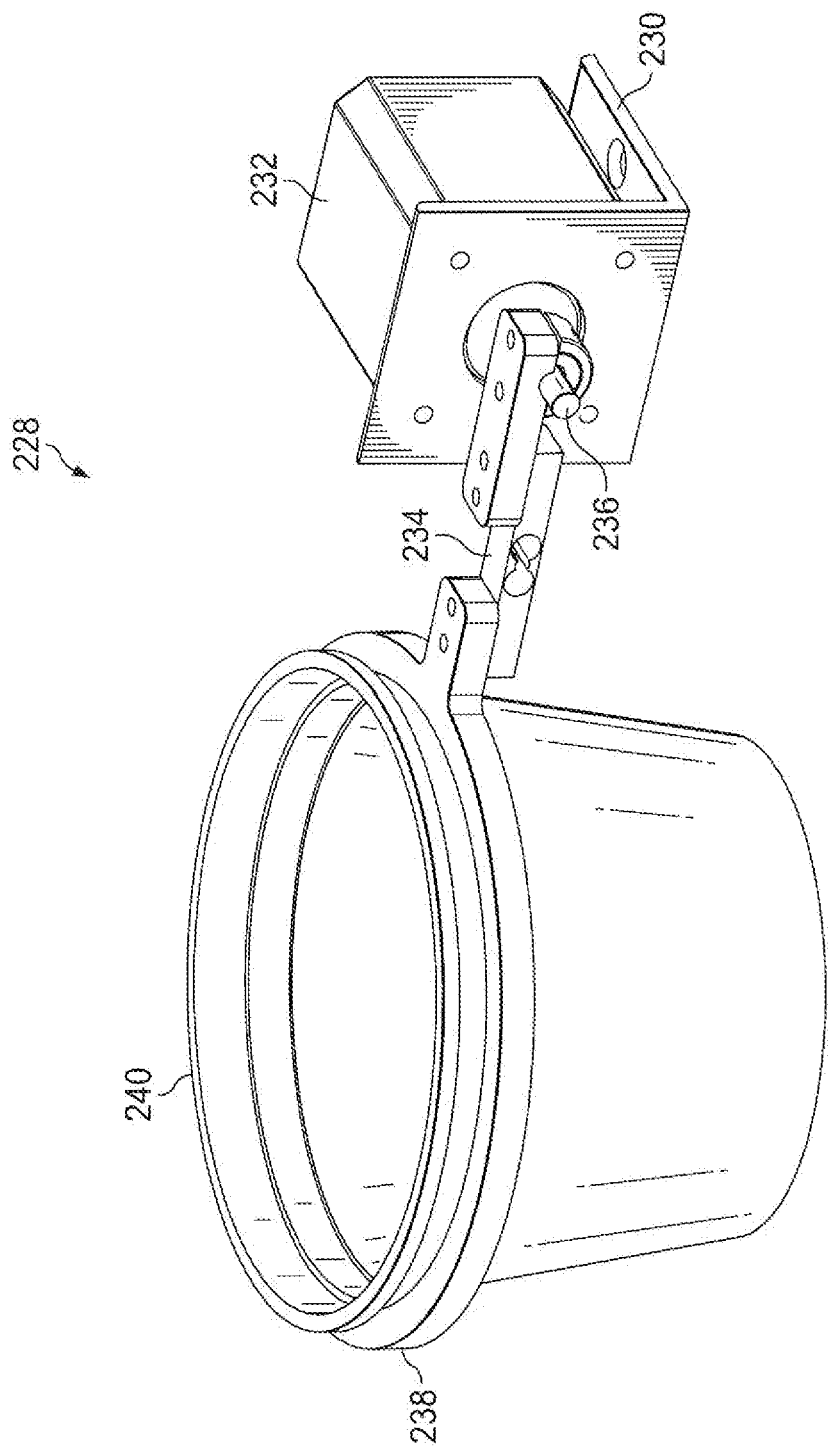
FIG. 17 is a perspective view of a transfer cup assembly 228 used in the sliding transfer assembly 206.

As shown in FIGS. 16 and 17, the linear sliding transfer assembly 206 used in the inventive kitchen 200 preferably comprises: a slide rail 224 which extends laterally across the kitchen housing 202; a sliding transfer cup carrier 226 which is mounted for side-to-side sliding movement on the slide rail 224; and one or more, preferably a plurality, of transfer cup assemblies 228 which are mounted on and carried by the sliding carrier 226. The automated sliding movement of the sliding carrier 226 on the slide rail 224 is preferably accomplished using a timing belt and pulley driven by a stepper motor.

Each of the transfer cup assemblies 228 preferably comprises: an attachment bracket 230 for attaching the transfer assembly 228 to the top of the sliding carrier 226; a stepper motor 232 mounted on the attachment bracket 230; a cup pivoting arm 234 which is secured to and extends radially from the drive shaft 236 of the stepper motor 232; a cup holder ring 238 secured or otherwise provided on the distal end pivoting arm 234; and an ingredient transfer cup 240 which is removably positioned in the cup holder ring 238. A load cell is preferably also included in the pivot arm assembly 234 of the transfer cup assembly 228 in order to determine that actual weight amount of the ingredient placed in the transfer cup 240 so that the cooking time, temperature, other parameters, or a combination thereof for the meal or other food product can be automatically adjusted if necessary to ensure that the meal or other food product is neither under nor overcooked.

In order to transfer the ingredients for a selected meal from the ingredient dispensing modules 204 to the cooking pot 15 of one of the cooking module assemblies 100, the belt drive is actuated to slide the carrier 226 on the slide rail 224 so that one of the transfer cup assemblies 228 is positioned in front of and below a desired ingredient dispensing module 204. Either before, after, or while being moved laterally to the desired ingredient dispenser 204, the transfer cup assembly 228 in question will be automatically actuated to cause the stepper motor 232 thereof to pivot the cup pivoting arm 234 and the transfer cup 240 of the assembly 228 to a rearward horizontal receiving position 242 which is preferably about 90° from vertical. This places the transfer cup 240 in an upright receiving position beneath the ingredient discharge 214 of the ingredient dispensing module 204.

The ingredient dispensing module 204 is then automatically activated to dispense (i.e., to drop) the preset amount of the ingredient in question into the transfer cup 240. Subsequently, the belt drive is again actuated to slide the carrier 226 so that the loaded transfer cup assembly 228 is positioned above and behind the preparation pot 15 of a preparation module assembly 100 which has been automatically selected for cooking and/or mixing the meal. Either before, during, or after the arrival of the loaded transfer cup assembly 228, the preparation module assembly 100 in question will be automatically actuated to pivot the pot 15 thereof to its upward loading orientation 80.

Thus, after the loaded transfer cup assembly 228 arrives and the pot 15 is placed in its upward loading orientation 80, the loaded transfer cup assembly 228 will be automatically actuated to cause the stepper motor 232 thereof to pivot the cup pivoting arm 234 and the transfer cup 240 of the assembly 228 to a forward horizontal dumping position 244 which is preferably about 90° from vertical. This causes the ingredient contained in the transfer cup 240 to fall into the pot 15. Moreover, to prevent the ingredient from falling out of the transfer cup 240 as the cup is pivoted 180° from its rearward receiving position 242 to its forward dumping position 244, the speed of the pivoting movement will be sufficient to ensure that the ingredient is retained in the transfer cup 240 by centrifugal force.

Figure 18:
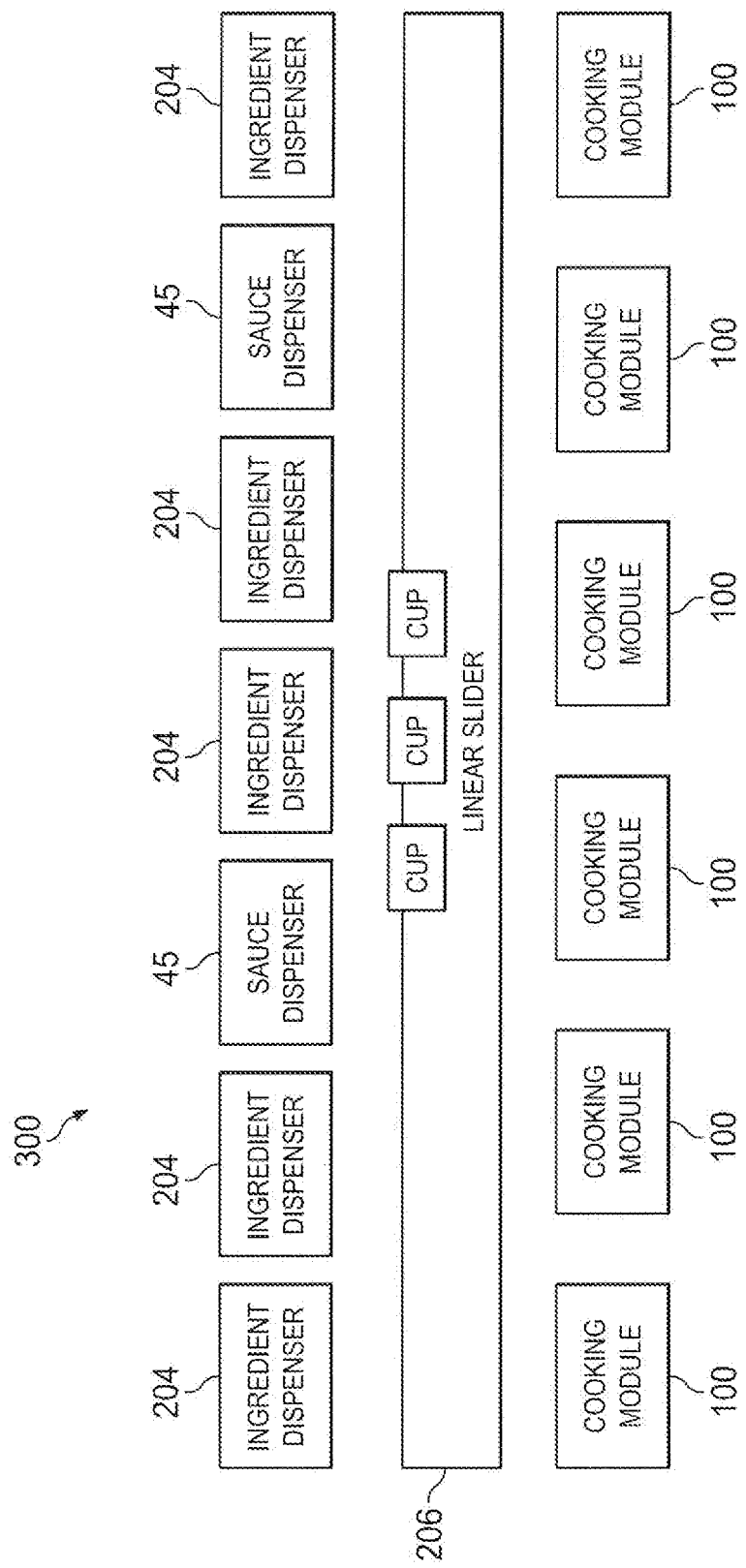
FIG. 18 schematically illustrates an alternative embodiment 300 of the inventive kitchen apparatus.

Another alternative embodiment 300 of the inventive automated kitchen is schematically illustrated in FIG. 18. The inventive kitchen 300 is substantially the same as kitchen 200 except that one or more dispenser modules 45 of the type described above for dispensing liquid or semi-liquid ingredients have been added to and/or have replaced one or more of the ingredient dispenser modules 204.

Figure 19:
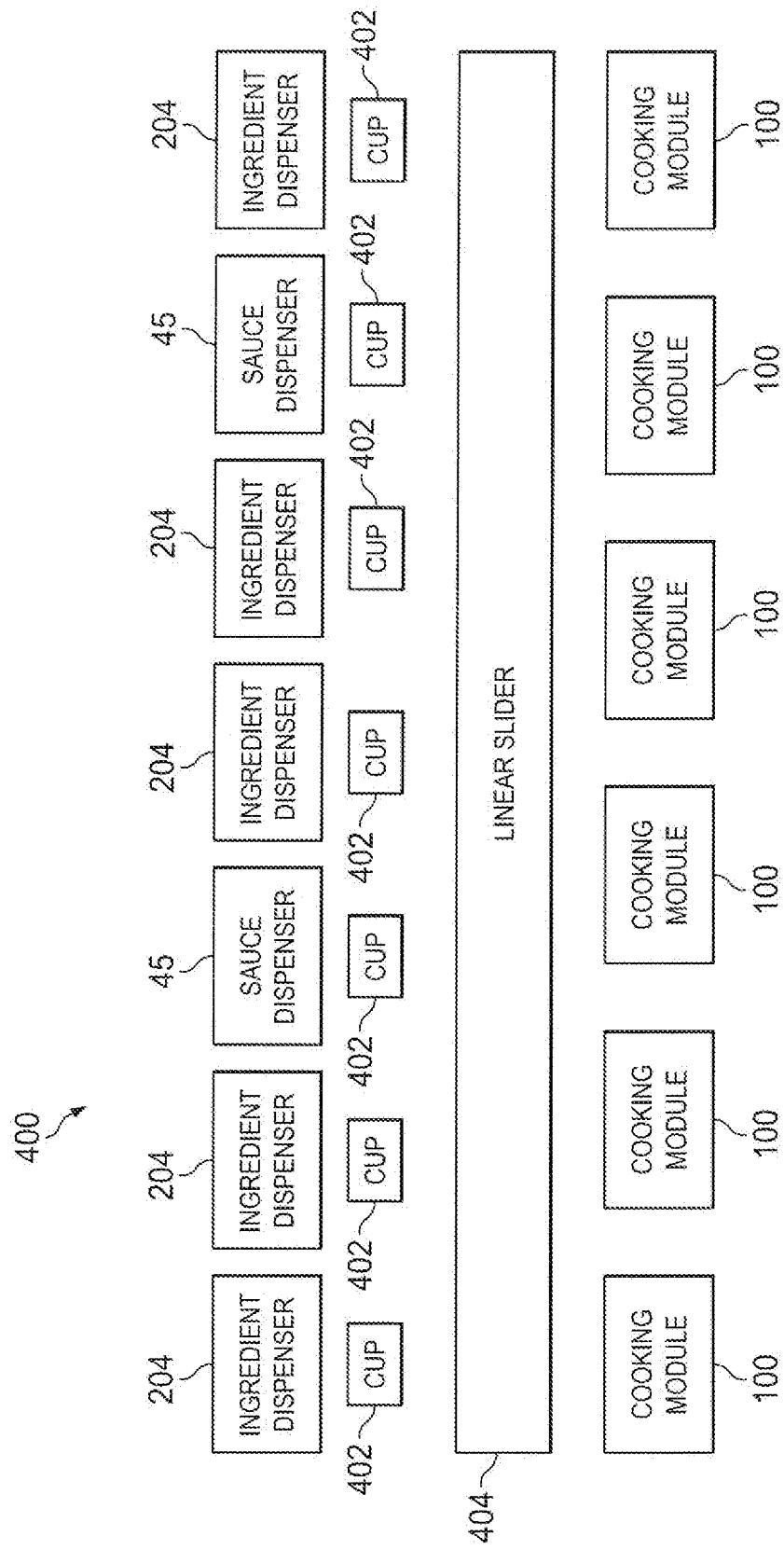
FIG. 19 schematically illustrates an alternative embodiment 400 of the inventive kitchen apparatus.

Another alternative embodiment 400 of the inventive automated kitchen is schematically illustrated in FIG. 19. The inventive kitchen 400 is substantially the same as kitchen 300 except that each of the dispenser modules 204 and 45 will have its own assigned transfer cup 402 and the linear sliding transfer assembly 404 of kitchen 400 will instead operate to slide to the desired transfer cup 402, carry the loaded cup 402 to the correct preparation module 100, transfer the ingredient in the cup 402 to the preparation pot 15 of the preparation module 100, and then return the cup 402 to its corresponding dispenser 204 or 45.

Figure 20:
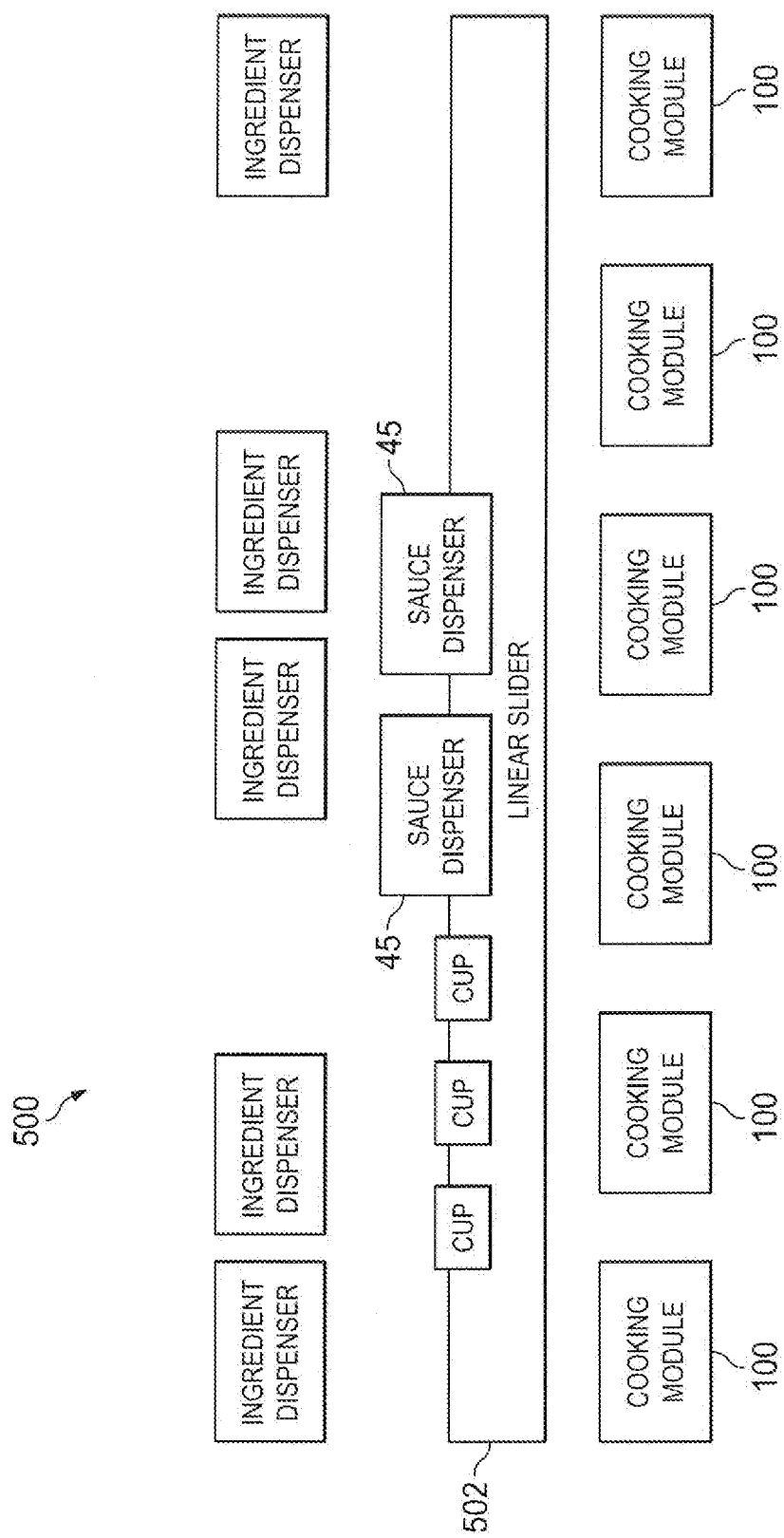
FIG. 20 schematically illustrates an alternative embodiment 500 of the inventive kitchen apparatus.

Another alternative embodiment 500 of the inventive automated kitchen is schematically illustrated in FIG. 20. The inventive kitchen 500 is substantially the same as kitchen 200 except that one or more dispenser modules 45 for dispensing liquid or semi-liquid ingredients are instead added directly to the linear sliding transfer assembly 502 of kitchen 500 for sliding the dispenser modules 45 to the appropriate preparation modules 100 and then directly dispensing the liquid or semi-liquid ingredients from the dispensers 45 into the preparation pots 15.

Figure 21:
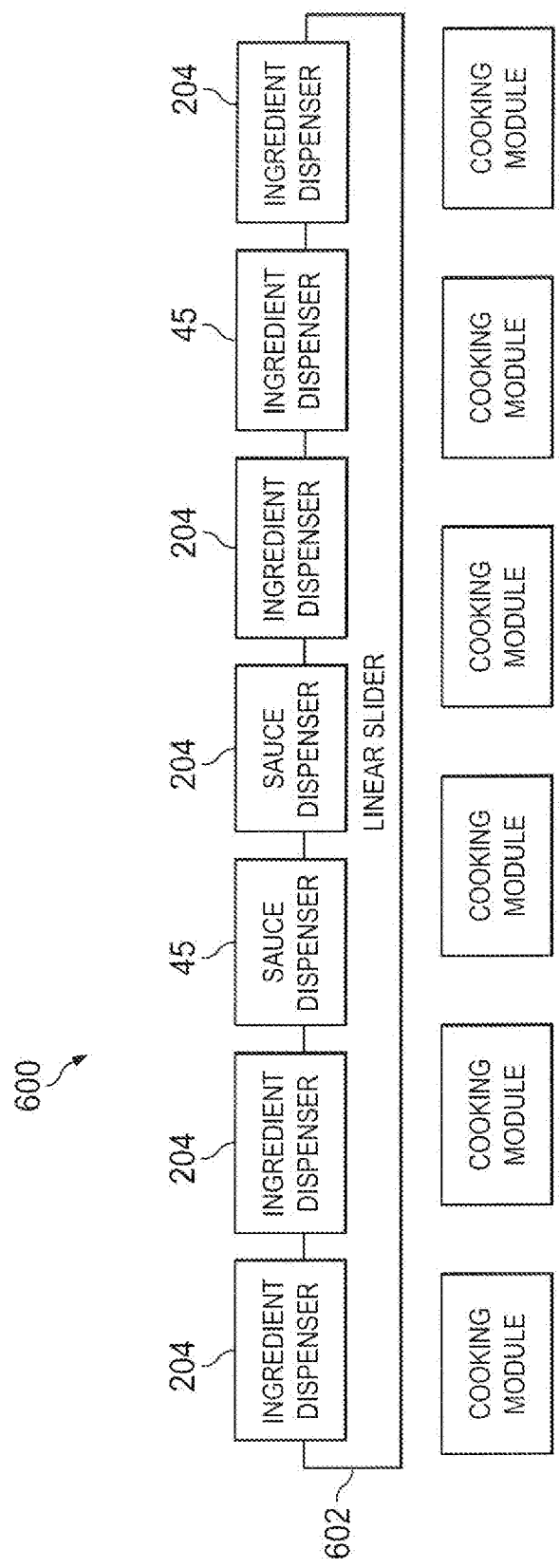
FIG. 21 schematically illustrates an alternative embodiment 600 of the inventive kitchen apparatus.

Another alternative embodiment 600 of the inventive automated kitchen is schematically illustrated in FIG. 21. The inventive kitchen 500 is substantially the same as kitchen 500 except that one or more dispenser modules 204 is/are also mounted on the linear sliding transfer assembly 602 of kitchen 600.

Figure 22:
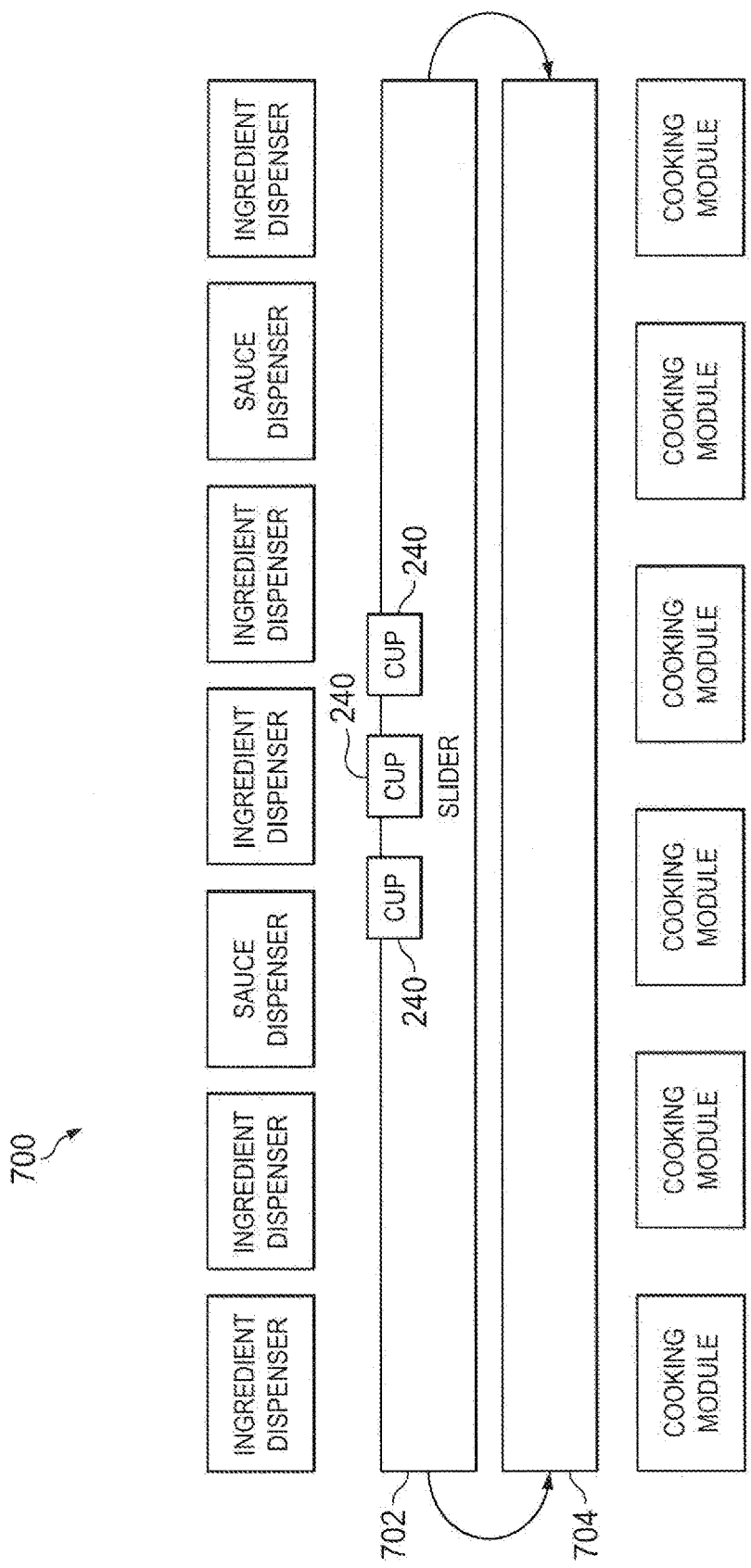
FIG. 22 schematically illustrates an alternative embodiment 700 of the inventive kitchen apparatus.

Another alternative embodiment 700 of the inventive automated kitchen is schematically illustrated in FIG. 22. The inventive kitchen 700 is substantially the same as kitchen 300 except that the sliding transfer assembly 702 of the kitchen 700 uses a continuous track loop 704 around which the transfer cup carrier and cups 240 rotate.

It will also be understood that the rotating kitchen 2 described above can be modified such that, similar to kitchen 200, both the preparation module assemblies 14 and the dispensing modules 10 of the kitchen 2 remain in fixed position and a transfer assembly similar to the sliding transfer assembly 206 used in kitchen 200 slides or rotates in a continuous or non-continuous circular or semi-circular path between the dispensing modules 10 and the preparation modules 14 for transferring ingredients from the dispensing modules 10 to the preparation pots 15.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. An automated system for preparing meals comprising:
    a plurality of ingredient holding and dispensing assemblies, each of the ingredient holding and dispensing assemblies comprising a container for holding a supply of an ingredient and a dispenser for dispensing an amount of the ingredient from a discharge of the ingredient holding and dispensing assembly and
    a plurality of heating and mixing assemblies which each comprise a heating pot configured for rotating the heating pot about a longitudinal rotational axis of the heating pot,
    each of the heating pots of the one or more heating assemblies comprising (i) a closed base end, (ii) an opening at an outer end of the heating pot through which the ingredients dispensed by one or more of the ingredient holding and dispensing assemblies are directly or indirectly delivered into the heating pot, (iii) a side wall which extends longitudinally from the closed base end and surrounds the longitudinal rotational axis, (iv) a heating cavity within the heating pot which is surrounded by the side wall, and (v) an interior surface of the side wall which is within and which surrounds the heating cavity,
    each of the heating pots also comprising an internal mixing fin structure which runs longitudinally along and is formed on or attached to the interior surface of side wall so that the internal mixing fin structure projects from the interior surface of the side wall into the heating cavity,
    the mixing fin structure of each of the heating pots is carried by the side wall when the heating pot rotates about the longitudinal rotational axis so that the mixing fin structure revolves around the longitudinal rotational axis, and
    the heating pot of each of the heating and mixing assemblies also being configured for pivoting the heating pot about a secondary axis between (i) an upward ingredient receiving orientation, (ii) a heating and mixing orientation which is pivoted downwardly from the upward ingredient receiving orientation to an angle which is not more than 90° from vertical, and (iii) a dispensing orientation which is pivoted downwardly from the heating and mixing orientation to an angle which is not more than 180° from vertical.

2. The automated system of claim 1 wherein each of the heating and mixing assemblies further comprises a heating element for heating the heating pot of the heating and mixing assembly wherein the heating element is positioned adjacent to the heating pot when the heating pot is in the heating and mixing orientation.

3. The automated system of claim 2 wherein the heating elements for the heating and mixing assemblies are induction elements.

4. The automated system of claim 1 wherein the ingredient holding and dispensing assemblies are movable with respect to the heating and mixing assemblies so that the discharge of each of the ingredient holding and dispensing assemblies is positionable above the heating pot of each of the heating and mixing assemblies for dispensing the ingredients held by the ingredient holding and dispensing assemblies into the heating pot.

5. The automated system of claim 1 wherein the heating and mixing assemblies are movable with respect to the ingredient holding and dispensing assemblies so that the heating pot of each of the heating and mixing assemblies is positionable beneath the discharge of each of the ingredient holding and dispensing assemblies for dispensing the ingredients held by the ingredient holding and dispensing assemblies into the heating pots.

6. The automated system of claim 1 wherein in each of the heating pots, the internal mixing fin structure projects inwardly from the interior surface of the side wall into the heating cavity a distance in the range of from 1 cm to 6 cm.

7. The automated system of claim 1 wherein the internal mixing fin structure of each of the heating pots has a leading contacting surface in a direction of rotation of the heating pot and, as the internal mixing fin structure extends into the heating cavity of the heating pot from the interior surface of the side wall, the leading contacting surface is angled away from the direction of rotation.

8. The automated system of claim 7 wherein the leading contacting surface of the internal mixing fin structure is curved.

9. The automated system of claim 1 wherein a dispenser for at least one of the ingredient holding and dispensing assemblies comprises
a reciprocatable tray for dispensing the ingredient held by the ingredient holding and dispensing assembly and
a trimming blade which is movable in a cutting motion to cut away any excess amount of the ingredient which projects from a top of the reciprocatable tray.

10. The automated system of claim 9 wherein the cutting motion of the of the trimming blade is a spinning motion of the trimming blade which cuts away any excess amount of the ingredient which projects from the top of the reciprocatable tray.

11. The automated system of claim 1 further comprising a transfer assembly comprising one or more transfer containers mounted for automated movement from any of the ingredient holding and dispensing assemblies to any of the heating and mixing assemblies and for automated movement from any of the heating and mixing assemblies to any of the ingredient holding and dispensing assemblies.

12. The automated system of claim 1 wherein each of the heating and mixing assemblies further comprises:
a drive shaft which extends from the closed base end of the heating pot of the heating and mixing assembly for rotating the heating pot about the longitudinal rotational axis of the heating pot, the drive shaft having a rotational axis which is coaxial with the longitudinal rotational axis of the heating pot and
a motor which directly or indirectly rotates the drive shaft, about the rotational axis of the drive shaft.

13. An automated system for preparing meals comprising:
at least one ingredient holding and dispensing assembly and
at least one heating assembly which comprises a heating pot configured for rotating the heating pot about a longitudinal rotational axis of the heating pot,
the heating pot comprising (i) a closed base end and (ii) an opening at an outer end of the heating pot through which ingredients dispensed lay the at least one ingredient holding and dispensing assembly are directly or indirectly delivered into the heating pot,
the at least one heating assembly also comprising:
a drive shaft which extends from the closed base end of the heating pot of the heating assembly for rotating the heating pot about the longitudinal rotational axis of the heating pot, the drive shaft having a rotational axis which is coaxial with the longitudinal rotational axis of the heating pot,
a motor which directly or indirectly rotates the drive shaft about the rotational axis of the drive shaft, and
a heating element for heating the heating pot of the heating assembly wherein the heating element is positioned adjacent to the heating pot when the heating pot is in the heating orientation, and
the heating pot also being configured for pivoting the heating pot about a secondary axis between (i) an upward ingredient receiving orientation, (ii) a heating orientation which is pivoted downwardly from the upward ingredient receiving orientation to an angle which is not more than 90° from vertical, and (iii) a dispensing orientation which is pivoted downwardly from the heating orientation to an angle which is not more than 180° from vertical.

14. The automated system of claim 13 wherein the heating element is an induction heating element.

15. An automated system for preparing meals comprising:
at least one ingredient holding and dispensing assembly;
at least one heating, assembly which comprises a heating pot; and
a transfer assembly comprising one or more transfer containers mounted for automated movement from the at least one ingredient holding and dispensing assembly to the at least one beating assembly and for automated movement from the at least one heating assembly to the at least one ingredient holding and dispensing assembly, wherein the transfer assembly further comprises:
a slide rail and
a carrier which is slideably mounted on the slide rail,
each of the one or more transfer containers having an open top and each of the one or more transfer containers being carried on a distal end of a pivoting arm structure,
each said pivoting arm structure having a proximal end which is pivotally carried by the carrier, and
wherein for each said pivoting arm structure, an actuator is provided which directly or indirectly pivots the pivoting arm structure with sufficient speed from (i) a receiving position in which the open top of the transfer container is facing upward for receiving the ingredients from the at least one holding and dispensing assembly to (ii) a dumping position in which the open top of the transfer container is facing downward for dumping the ingredients into the heating pot of the at least one heating assembly such that the ingredients are retained in the transfer container carried on the distal end of the pivoting arm structure by centrifugal force until the pivoting arm structure reaches the dumping position.

16. The automated system of claim 15 wherein the actuator is a stepper motor.

* * * * *

UNITED STATES PATENT AND TRADEMARK OFFICE
CERTIFICATE OF CORRECTION

PATENT NO. : 10,154,762 B2
APPLICATION NO. : 15/137968
DATED : December 18, 2018
INVENTOR(S) : Michael S. Farid et al.

Page 1 of 1

It is certified that error appears in the above-identified patent and that said Letters Patent is hereby corrected as shown below:

In the Claims

Claim 15, Column 14, Line 19: Delete the "," after the word heating

Claim 15, Column 14, Line 24: Replace the word "beating" with "heating"

Signed and Sealed this
Thirtieth Day of July, 2019

Andrei Iancu
*Director of the United States Patent and Trademark Office*